(12) United States Patent
Sharp et al.

(10) Patent No.: US 11,131,765 B2
(45) Date of Patent: Sep. 28, 2021

(54) POSITIONING DEVICE, COMMUNICATIONS SYSTEM AND METHOD

(71) Applicant: Ocado Innovation Limited, Hatfield (GB)

(72) Inventors: David Sharp, Hatfield (GB); Joseph Zammit, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 0 days.

(21) Appl. No.: 16/956,332

(22) PCT Filed: Dec. 20, 2018

(86) PCT No.: PCT/EP2018/086105
§ 371 (c)(1),
(2) Date: Jun. 19, 2020

(87) PCT Pub. No.: WO2019/122080
PCT Pub. Date: Jun. 27, 2019

(65) Prior Publication Data
US 2021/0080560 A1 Mar. 18, 2021

(30) Foreign Application Priority Data
Dec. 21, 2017 (GB) ..................... 1722290

(51) Int. Cl.
*G01S 13/76* (2006.01)
*H04W 4/029* (2018.01)
(Continued)

(52) U.S. Cl.
CPC .......... *G01S 13/765* (2013.01); *G01S 5/0081* (2013.01); *G01S 5/0263* (2013.01); *H04W 4/029* (2018.02)

(58) Field of Classification Search
CPC ......... H04W 4/029; H04W 64/00; G01S 5/10; G01S 5/12; G01S 13/765; G01S 15/74;
(Continued)

(56) References Cited

U.S. PATENT DOCUMENTS 9,075,125 B2   7/2015 Aldana
9,395,433 B2   7/2016 Aldana
(Continued)

FOREIGN PATENT DOCUMENTS

EP   2653886 A1 * 10/2013 ............... G01S 5/02
EP   2653886 A1   10/2013
(Continued)

OTHER PUBLICATIONS

International Search Report (PCT/ISA/210) and Written Opinion (PCT/ISA/237) dated Apr. 16, 2019, by the European Patent Office as the International Searching Authority for International Application No. PCT/EP2018/086105.
(Continued)

*Primary Examiner* — Brandon J Miller
(74) *Attorney, Agent, or Firm* — Buchanan Ingersoll & Rooney PC

(57) ABSTRACT

A device can determine its position in a communications system. A scalable solution permits multiple devices to be used in one area without detrimental effect on the accuracy or latency of the position determining. The communications system includes a first base station arranged to transmit a first signal to a second base station arranged receive the first signal and transmit a second signal to the first base station in response The first base station is arranged to receive the second signal and transmit a third signal to the second base station in response to the second signal delay time measuring unit, round trip time measuring unit, a base station timings unit and a calculating unit are used to calculate a first
(Continued)

time difference of arrival based on a first round trip time, first delay time, second round trip time and a second delay time.

48 Claims, 17 Drawing Sheets

(51) Int. Cl.
  *G01S 5/00* (2006.01)
  *G01S 5/02* (2010.01)
(58) Field of Classification Search
  CPC .......... G01S 17/74; G01S 5/0081; G01S 5/16; G01S 5/26; G01S 5/28; G01S 5/0263; G01S 13/74; G01S 5/22; B65G 1/0464
  See application file for complete search history.

(56) References Cited

U.S. PATENT DOCUMENTS

| | | |
|---|---|---|
| 2014/0200026 A1 | 7/2014 | Aldana |
| 2015/0094103 A1* | 4/2015 | Wang .................... H04W 4/023 455/456.6 |
| 2015/0293206 A1 | 10/2015 | Aldana |
| 2015/0382143 A1 | 12/2015 | Lindskog et al. |
| 2017/0289946 A1 | 10/2017 | Aldana |

FOREIGN PATENT DOCUMENTS

| | | | |
|---|---|---|---|
| GB | 2530816 A * | 4/2016 | ............ H04W 4/023 |
| GB | 2530816 A | 4/2016 | |
| JP | 2016-510402 A | 4/2016 | |
| NO | 317366 B1 | 10/2004 | |
| WO | 9849075 A1 | 11/1998 | |
| WO | 2015019055 A1 | 2/2015 | |
| WO | 2015185628 A2 | 12/2015 | |
| WO | 2016 207297 A1 | 12/2016 | |

OTHER PUBLICATIONS

Neirynck et al in "An Alternative Double-Sided Two-Way Ranging Method", 13th Workshop on Positioning, Navigation and Communications (WPNC), Oct. 2016, pp. 1-4.
Office Action dated Jun. 29, 2021, by the Canadian Patent Office in corresponding Canadian Patent Application No. 3,079,934. (4 pages).
First Office Action dated Jun. 29, 2021, by the Japanese Patent Office in corresponding Japanese Patent Application No. 2020-531527, and an English Translation of the Office Action. (6 pages).

* cited by examiner

POSITIONING DEVICE, COMMUNICATIONS SYSTEM AND METHOD

This application claims priority from UK Patent Application No. 1722290.2 filed 21 Dec. 2017, the content of all of this application hereby being incorporated by reference.

TECHNICAL FIELD

The present invention relates generally to the field of positioning devices and more specifically to a device, method of operating a device, communications system, method of operating a communications system and a storage system for determining a position of the device.

BACKGROUND

In the field of positioning devices, a number of techniques exist to provide a device's location. For example, there are a number of existing wireless technologies which enable localisation to within one metre accuracy, for example Wi-Fi fingerprinting and GPS technology. However, when sub-metre accuracy is required then these technologies are not useful. Moreover, GPS has a lack of availability in an indoor environment.

Sub-metre accuracy may be provided utilising Ultra Wide Band based solutions using, for example, a Decawave DW1000 microchip which permits higher accuracy due (in part) to the finer resolution of their clocks (which count in increments of 15.625 picoseconds, hence counting approximately 200 times in the time it takes light, or wireless signals, to travel 1 metre). Ultra Wide Band systems are well suited to solving a positioning question due to their high multipath fading immunity.

The Decawave DW1000 permits sub-metre positioning utilising a technique called Asymmetric Two-Way Ranging (ATWR). The aim of "ranging" techniques generally is, through the exchange of signals between fixed base stations in known locations and mobile devices in unknown locations, to determine the distance (or "range") between base stations and mobile devices. For any given (mobile) device of unknown location, each range to a known location can be used to determine (in three dimensions) a spherical surface around the known location on which the mobile device may lie. By intersecting multiple spherical surfaces, a location may be obtained. As such, four readings is sufficient to find a location, although further readings can be of help. FIG. 1 demonstrates this technique in a two dimensional example. In particular, circle 101 corresponds to a field of transmissions from BS1. Similarly, circles 102 and 103 correspond with the field of transmissions from BS2 and BS3, respectively. Device D, of unknown location, is thereby able to determine its position by determining its distance from each of BS1 to BS3 and, knowing the fixed locations of each of BS1 to BS3, is thereby able to determine its own position.

The schemes proposed in Neirynck et al in "An Alternative Double-Sided Two-Way Ranging Method" from 21 Oct. 2016, which is incorporated herein by reference, expose the evolution of two-way ranging solutions from the general technique which are very sensitive to clock stability to the Asymmetric Two-Way Ranging solution, in which the stability of the clock becomes a non-issue.

As shown in FIG. 2, the ATWR technique relies on signals sent between a base station BS of fixed location and a device D of unknown location. According to this technique, the base station sends a first signal 201 to the device D. Simultaneously, the base station BS records the time at which the first signal 201 was transmitted. The device D receives the first signal 201 and transmits a response as a second signal 202. Moreover, the device D records the delay time it took from receiving the first signal 201 and transmitting the second signal 202 as the device delay time $D_D$. Moreover, the device D records the time at which the second signal 202 is transmitted. The base station BS receives the second signal 202 and calculates a base station round trip time $R_{BS}$ as the time between transmitting the first signal and receiving the second signal.

The base station BS transmits a third signal 203 to the device D which includes information about the base station round trip time $R_{BS}$ and a base station delay time $D_{BS}$ which is a time between receiving the second signal 202 and transmitting the third signal 203. The device D receives the third signal, including the information contained therein and calculates the time of flight between the base station BS and the device D, as follows:

$$T_{flight} = \frac{R_{BS} R_D - D_{BS} D_D}{R_{BS} + D_{BS} + R_D + D_D}$$

The time of flight is indicative of the distance between the base station BS and the device D. The device D performs the same ATWR exchange with other base stations of known location and thereby determines its position based on the time of flight measurements from the other base stations, for example, as shown in FIG. 1 by finding the overlap in circles/spheres from the base stations. This is known as trilateration which is typically employed by way of trilateration by optimisation. ATWR can obtain measurements which, in theory, give sub-millimetre accuracy. In practice, due to the impact of noise and other factors, accuracy to 10 cm is possible. This is unlike other known Two-Way Ranging techniques which, using a crystal clock are liable to errors of approximately 7 m.

However ATWR is not scalable because all of the devices at unknown positions have to each transmit messages to base stations in order to determine their range. They must also then receive replies from base stations and transmit responses. This results in far too much communication for a setup comprising a large number of devices and also necessitates the coordination of such communications if a lossy/unreliable "try else retry" system is to be avoided.

SUMMARY

In view of the problems in known Two-Way Ranging techniques, the present invention aims to provide an apparatus and method for such a position determining device such that a number of devices may be used in one area without latency or accuracy problems.

According to the present invention there is provided a device arranged to operate in a communications system. The communications system comprises a first base station and a second base station. The first base station is arranged to transmit a first signal to the second base station and the second base station is arranged receive the first signal and transmit a second signal to the first base station in response to the first signal. Moreover, the first base station is arranged to receive the second signal and transmit a third signal to the second base station in response to the second signal. The device comprises a receiving unit arranged to receive each of the first and third signals from the first base station and the second signal from the second base station. A delay time measuring unit is arranged to measure a first delay time as a time between receiving the first signal from the first base station and receiving the second signal from the second base station. A round trip time measuring unit is arranged to measure a first round trip time as a time between receiving the second signal from the second base station and receiving the third signal from the first base station. A base station timings unit is arranged to determine a second round trip time and a second delay time from at least one received signal. A calculating unit is arranged to calculate a first time difference of arrival based on the first round trip time, first delay time, second round trip time and second delay time.

The present invention also provides a communications system comprising a first base station, a second base station, and a device as previously described. The first base station is arranged to transmit a first signal to the second base station, the second base station is arranged receive the first signal and transmit a second signal to the first base station in response to the first signal and the first base station is arranged to receive the second signal and transmit a third signal to the second base station in response to the second signal.

The present invention also provides a storage system. The storage system comprises a first set of parallel rails or tracks extending in the X-direction, and a second set of parallel rails or tracks extending in a Y-direction transverse to the first set in a substantially horizontal plane to form a grid pattern comprising a plurality of grid spaces. Moreover, a plurality of stacks of containers located beneath the rails, and arranged such that each stack is located within a footprint of a single grid space and a multiplicity of load handling devices, each load handling device being arranged to selectively move laterally in the X and Y directions, above the stacks on the rails. The storage system further comprises a communications system as previously described, wherein each of the base stations are positioned in locations around, in or on the plurality of stacks of containers, and the multiplicity of load handling devices each comprise a device.

The present invention also provides a method of operating a device in a communications system. The communications system comprises a first base station and a second base station. The first base station is arranged to transmit a first signal to the second base station and the second base station is arranged receive the first signal and transmit a second signal to the first base station in response to the first signal. Moreover, the first base station is arranged to receive the second signal and transmit a third signal to the second base station in response to the second signal. The method comprises the steps of receiving each of the first and third signals from the first base station and the second signal from the second base station, measuring a first delay time as a time between receiving the first signal from the first base station and receiving the second signal from the second base station, measuring a first round trip time as a time between receiving the second signal from the second base station and receiving the third signal from the first base station, determining a second round trip time and a second delay time from at least one received signal, and calculating a first time difference of arrival based on the first round trip time, first delay time, second round trip time and second delay time.

The present invention also provides a method of operating a communications system comprising the steps of transmitting, by a first base station, a first signal to a second base station, receiving, by the second base station, the first signal, transmitting, by the second base station, a second signal to the first base station in response to the first signal, receiving, by the first base station, the second signal, transmitting, by the first base station, a third signal to the second base station in response to the second signal and the method of operating a device as previously described.

BRIEF DESCRIPTION OF THE DRAWINGS

Embodiments of the invention will now be described by way of example only with reference to the accompanying drawings, in which like reference numbers designate the same or corresponding parts, and in which.

DETAILED DESCRIPTION OF EMBODIMENTS

First Embodiment

Figure 1:
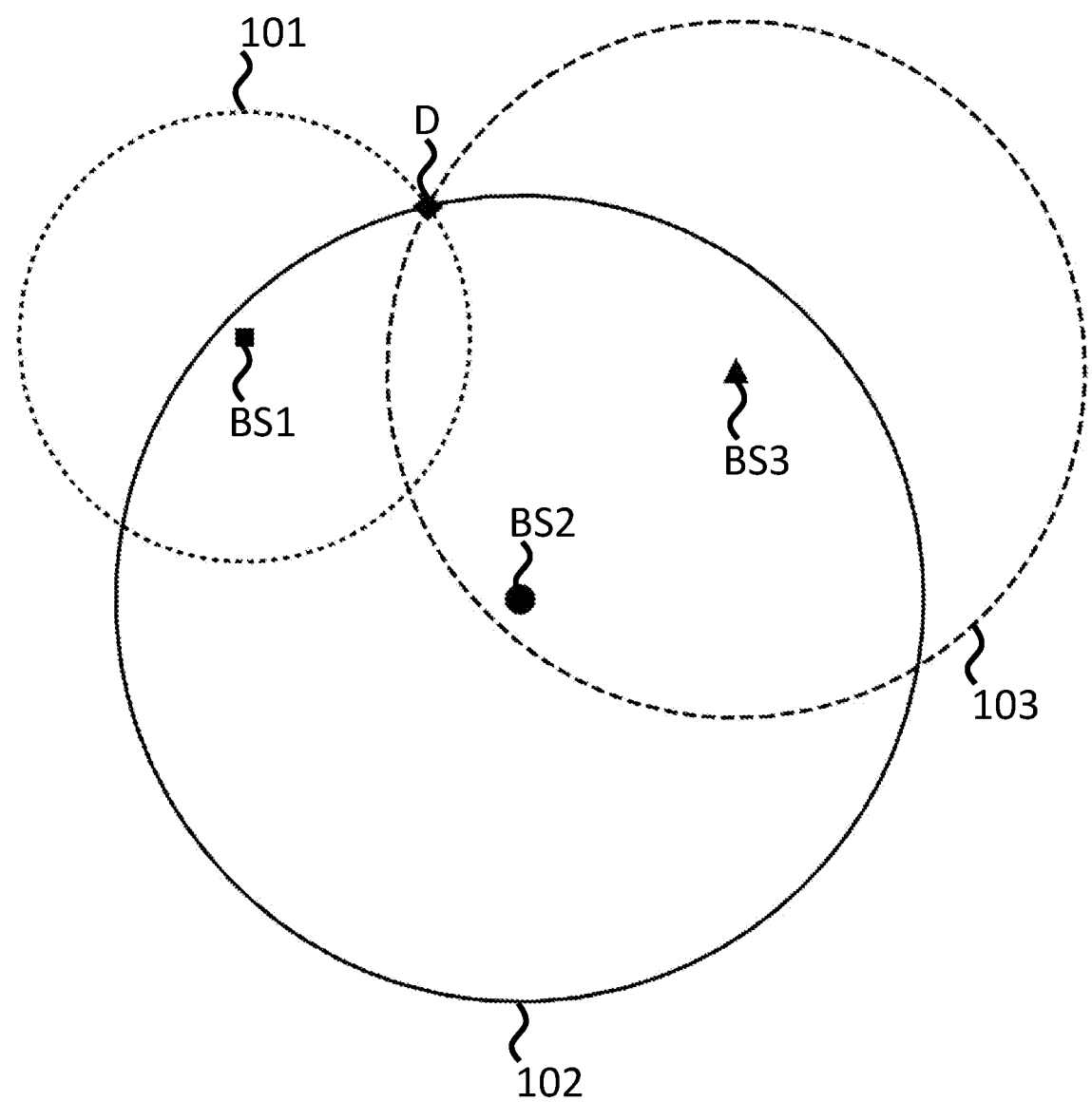
FIG. 1 is a schematic diagram showing a device D determining its position in a known two-way ranging system.
Figure 2:
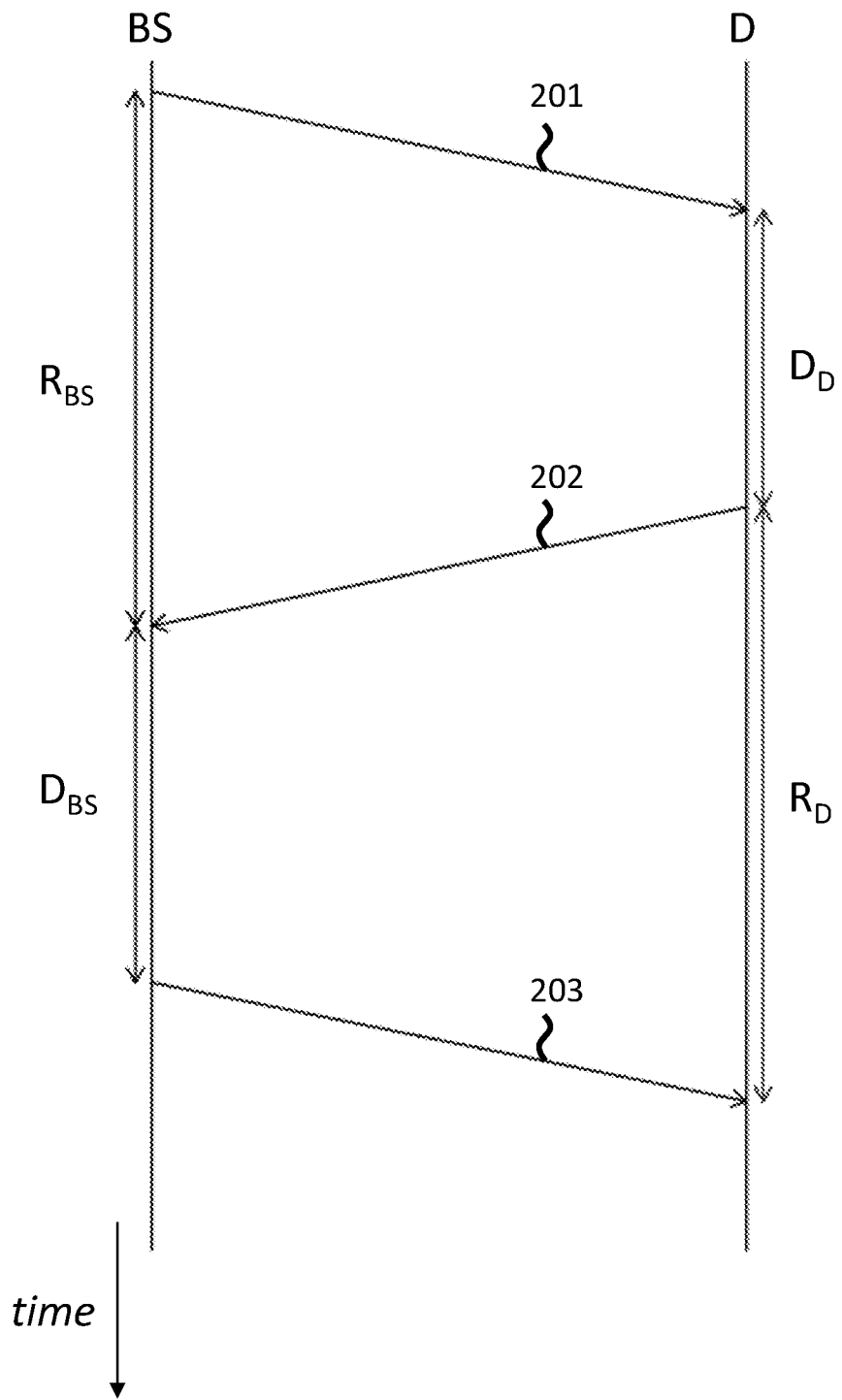
FIG. 2 is a signals diagram of the system of FIG. 1 showing the signals transmitted between a base station and the device D according to the ATWR technique of ranging.
Figure 3:
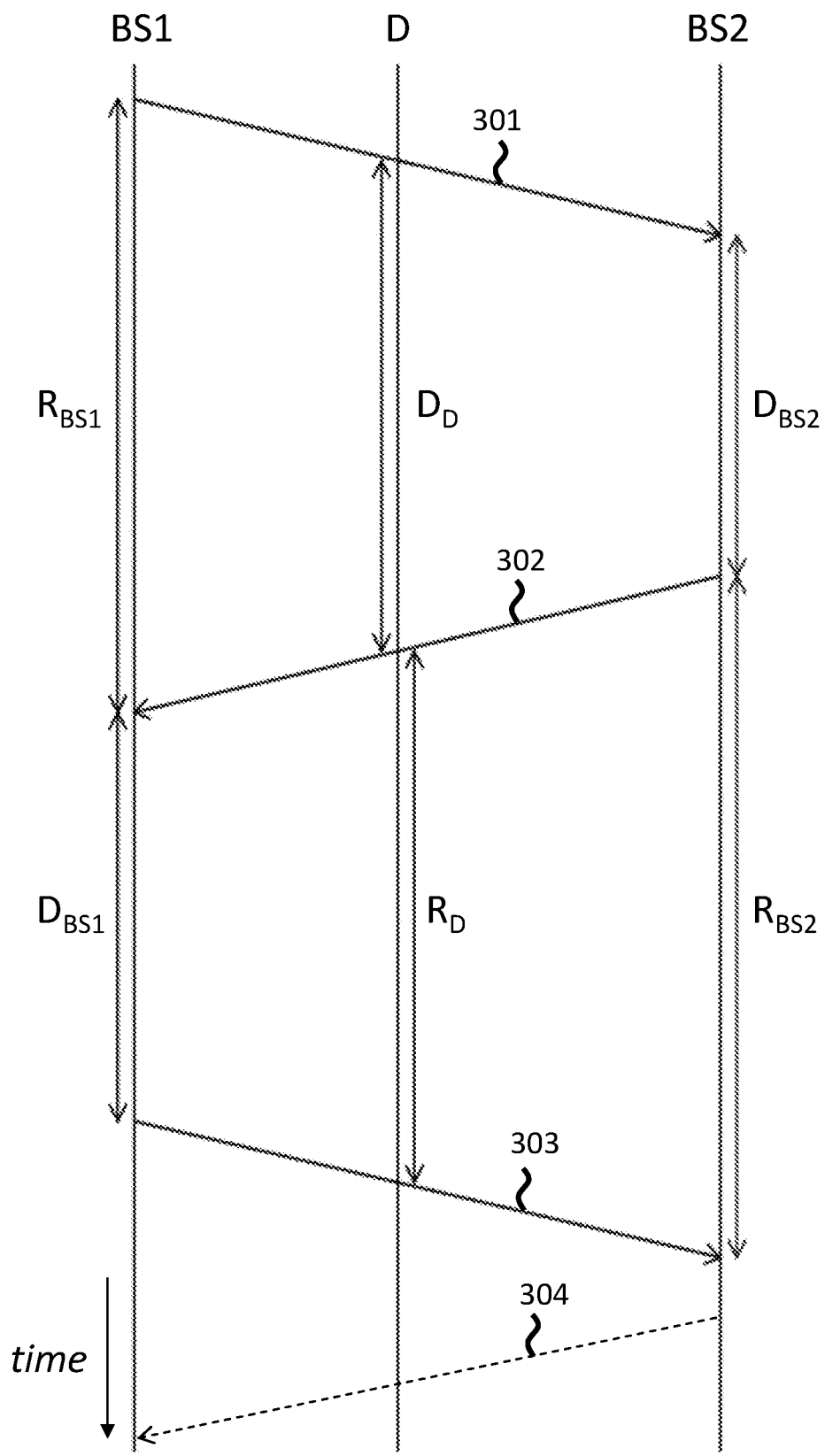
FIG. 3 is a signals diagram of the device according to a first embodiment of the present invention operating in a communications system comprising a first and second base station.

FIG. 3 depicts a device D according to the first embodiment of the present invention. The device D is located in a communication system comprising a first base station BS1 and a second base station BS2.

As depicted in FIG. 3, and in this embodiment, the device D does not transmit signals to the base stations. Instead, the device D receives the signals being transmitted between the first base station and second base station. The device D calculates a time difference of arrival (TDOA) based on the signals being transmitted between the base stations.

More particularly, the first base station BS1 and second base station BS2 are positioned apart. In general, the distance between the first base station BS1 and second base station BS2 is known to the device D, however, this need not be the case. The position of the device D is not known, either to the base stations or to the device D itself.

As shown in FIG. 3, a round trip time of the first base station $R_{BS1}$ is the time between transmitting the first signal 301 and receiving a response from the second base station BS2 in the form of a second signal 302. Moreover, a delay time of the first base station $D_{BS1}$ is a time between receiving the second signal 302 and transmitting a third signal 303 to the second base station BS2.

A delay time of the device $D_D$ is a time between receiving the first signal 301 and receiving the second signal 302. Moreover, a round trip time of the device $R_D$ is a time between receiving the second signal 302 and receiving the third signal 303.

Optionally, a delay time of the second base station $D_{BS2}$ is a time between receiving the first signal 301 and transmitting the second signal 302. Moreover, a round trip time of the second base station $R_{BS2}$ is a time between transmitting the second signal 302 and receiving the third signal 303.

In more detail, the first base station BS1 transmits a first signal 301 to the second base station BS2. As will be appreciated, the signal may take one of many forms, for example, the signal may be radio frequency transmissions, light transmissions, acoustic, ultrasound or any other transmissions means which the device D is able to receive the signal whilst the signal is being transmitted from the first base station BS1 to the second base station BS2.

The first signal 301 need not necessarily contain any specific information, instead the mere act of transmission may be used by the device D to determine a time difference of arrival. However, the first signal 301 may contain any of: an indication that it is the first signal transmitted, from which base station it originated, to which base station it was transmitted, the time at the first base station BS1 at which the first signal 301 was transmitted. The first signal 301 traverses the distance between the first base station BS1 and second base station BS2 and in the process is received by the device D.

Optionally, the first base station BS1 may record the time at which transmission of the first signal 301 occurs. Alternatively, the first base station BS1 may start a timer when transmission of the first signal 301 occurs. Similarly, when the device D receives the first signal 301 it may record the time at which it received the first signal 301 or start a timer. It is not necessary for the second base station BS2 to record the time of reception of the first signal 301, however, the second base station BS2 may record this time or start a timer.

The second base station BS2, having received the first signal 301, is arranged to transmit a response to the first base station BS1 as a second signal 302. The second signal 302 need not have any content, simply the reception of the second signal 302 by the device D is enough to determine a time difference of arrival. However, the second signal 302 may contain any of: an indication that it is the second signal transmitted, from which base station it originated, to which base station it was transmitted, or the time at the second base station BS2 when the second signal 302 was transmitted. Optionally, the second signal 302 may contain an indication of the time of reception of the first signal 301 at the second base station BS2.

Optionally, at transmission of the second signal 302 the second base station BS2 may be arranged to record the time of transmission of the second signal 302 or stop the timer started on reception of the first signal 301. In this way, the second base station BS2 optionally determines a delay time of the second base station $D_{BS2}$. This time indicates the delay caused by the second base station BS2 in receiving the first signal 301 and transmitting the second signal 302.

Optionally, the second base station BS2 records the time of transmission of the second signal 302 or resets and starts a timer at transmission of the second signal 302.

The device D receives the second signal 302 and may record the time of reception or stop a timer started on reception of the first signal 301. In this way, the device D measures a delay time of the device $D_D$ caused by the delay between the device D receiving the first signal 301 and receiving the second signal 302. In addition, the device may record the time of reception of the signal 302 or reset and start a timer at reception of the second signal 302.

The first base station BS1 receives the second signal 302. Optionally, the first base station BS1 may record the time of reception of the second signal 302 or stop a timer started on transmission of the first signal 301. Optionally, the first base station BS1 may measure a round time trip time of the first base station $R_{BS1}$ as a time between transmitting the first signal and receiving the second signal. Moreover, the first base station BS1 may optionally record the time of receiving the second signal 302 or reset and start a timer. The first base station BS1 responds to the second signal 302 by transmitting a third signal 303 to the second base station BS2.

Optionally, when the first base station BS1 transmits the third signal 303, the first base station BS1 may record the time of transmitting the third signal 303 or stop the timer started on reception of the second signal 302. In this way, the first base station BS1 may record the delay time of the first base station $D_{BS1}$ between receiving the second signal 302 and transmitting the third signal 303. The transmitted third signal 303 may optionally comprise information indicative of the measured round trip time of the first base station $R_{BS1}$ and the measured delay time of the first base station $D_{BS1}$.

The device D receives the third signal 303 and may record the time of reception of the third signal 303 or stop the time started on reception of the second signal 302. In this way, the device D measures a round trip time of the device $R_D$. In one non-limiting embodiment, as will be explained later, the device D may decode a measured round trip time of the first base station $R_{BS1}$ and a measured delay time of the first base station $D_{BS1}$ which may be included in the third signal 303.

The third signal 303 is received by the second base station BS2. Optionally, the second base station BS2 records the time at which the third signal 303 is received or stop the timer started on transmission of the second signal 302. In this way the second base station BS2 may measure a round trip time of the second base station $R_{BS2}$ as a time between transmitting the second signal 302 and receiving the third signal 303.

Optionally, as will be explained later, the second base station BS2 may be arranged to transmit a fourth signal 304 comprising the measured delay time of the second base station $D_{BS2}$ and the round trip time of the second base station $R_{BS2}$. It is envisaged that the fourth signal 304 is transmitted at any point in time after the second base station BS2 receives the third signal 303. For example, the fourth signal 304 may be transmitted as a second signal 302 in a future exchange of signals between first base station BS1 and second base station BS2.

It will be appreciated that, for the device D to continue determining an accurate position, the first base station BS1 and second base station BS2 must repeatedly transmit the exchange of first to third signals described above.

With regard to FIG. 4, the detailed operation of the device D will now be described. In particular, the device D comprises a receiving unit 401, delay time measuring unit 402, a round trip time measuring unit 403, a base station timings unit 404 and a calculating unit 405. Optionally, the device D may further comprise any of a transmitting unit 406, an averaging unit 407 and/or a determining unit 408.

With regard to FIG. 3, the receiving unit 401 is arranged to receive signals transmitted by each of the first base station BS1 and second base station BS2. In particular, the receiving unit 401 is arranged to receive the first signal 301, second signal 302 and third signal 303 in a passive manner. More specifically, the receiving unit 401 intercepts those signals transmitted between the first base station BS1 and second base station BS2, and vice-versa.

Moreover, the receiving unit 401 may be further arranged to receive the fourth signal 304. As will be appreciated, the receiving unit 401 is arranged to take a form to receive the type of signals transmitted by each of the first base station BS1 and second base station BS2. For example, if the signals are radio frequency signals then the receiving unit 401 will be arranged to receive radio frequency signals. Similarly, if the signals are light signals then the receiving unit 401 will be arranged to receive light signals, for example, by way of photodiodes. It is envisaged that when the received signals comprise signal numbering information, for example, whether the signal is a first signal 301, second signal 302 or third signal 303, the receiving unit 401 may be further arranged to determine which signal has been received and then provide an indication of the received signal to the delay time measuring 402 and round trip time measuring unit 403, where appropriate. In particular, the delay time measuring unit 402 is arranged to receive an indication of the first signal 301 and second signal 302. The round trip time measuring unit 403 is arranged to receive an indication of the second signal 302 and third signal 303.

Similarly, when the first, second or third signals comprise information about time of transmission or reception, for example, when the first signal 301 comprises information indicative of the time of transmission of the first signal 301 from the first base station BS1 then the receiving unit 401 is arranged to decode the time of transmission information and pass it to the base station timings unit 404. Similarly, when the third signal 303 comprises information indicative of a time of reception of the second signal 302 at the first base station BS1 and the third signal 303 comprises information indicative of a time of transmission of the third signal 303 from the first base station BS1, then the receiving unit 401 is arranged to decode the time indications and pass them to the base station timings unit 404.

Optionally, the second signal 302 may comprise an indication of a time of reception of the first signal 301 at the second base station BS2 and an indication of a time of transmission of the second signal 302 at the second base station BS2. Accordingly, the receiving unit 401 may be arranged to decode those indications and pass them to the base station timings unit 404. Similarly, an optionally transmitted fourth signal 304 may comprise an indication of a time of reception of the third signal 303 at second base station BS2 and therefore the receiving unit 401 may be arranged to decode the indication and pass it to the base station timings unit 404.

The delay time measuring unit 402 is arranged to receive information indicative of the first signal 301 and second signal 302 and to measure a delay time of the device $D_D$ as an amount of time between receiving the first signal 301 and receiving the second signal 302. In one non-limiting example, the delay time measuring unit 402 may be arranged to record the time at which the first signal 301 is received. In this regard, the time recorded with be time local to the device D at which the first signal 301 is received. The delay time measuring unit 402 will be further arranged to record the time at which the second signal 302 is received. In other words, the time local to the device D at which the second signal 302 is received. Accordingly, the delay time measuring unit 402 is arranged to subtract the time of reception of the second signal 302 from the time of reception of the first signal 301 to thereby determine the delay time of the device $D_D$. Alternatively, in another non-limiting example, the delay time measuring unit 402 may be arranged to reset and start a timer when the first signal 301 is received. The delay time measuring unit 402 may be further arranged to stop the timer when the second signal 302 is received. In this way the value of the timer is the value of the delay time of the device $D_D$.

The round trip time measuring unit 403 is arranged to receive information indicative of the second signal 302 and third signal 303 and to measure a round trip time of the device $R_D$ as an amount of time between receiving the second signal 302 and receiving the third signal 303. In one non-limiting example, the round trip time measuring unit 403 may be arranged to record the time at which the second signal 302 is received. In this regard, the time recorded will be a time local to the device D at which the second signal 302 is received. The round trip time measuring unit 403 will be further arranged to record the time at which the third signal 303 is received. In other words, the time local to the device D at which the third signal 303 is received. Accordingly, the round trip time measuring unit 403 is arranged to subtract the time of reception of the third signal 303 from the time of reception of the second signal 302 to thereby determine the round trip time of the device $R_D$. Alternatively, in another non-limiting example, the round trip time measuring unit 403 may be arranged to reset and start a timer when the second signal 302 is received. The round trip time measuring unit 403 may be further arranged to stop the timer when the third signal 303 is received. In this way the value of the timer is the value of the round trip time of the device $R_D$.

The base station timings unit 404 is arranged to determine a first base station BS1 round trip time $R_{BS1}$ and a first base station BS1 delay time $D_{BS1}$ based on at least one received signal. For example, based on the received first, second and third signals the determining unit is arranged to determine the first base station BS1 round trip time $R_{BS1}$ and the first base station BS1 delay time $D_{BS1}$.

In one non-limiting example, the first base station BS1 round trip time $R_{BS1}$ and the first base station BS1 delay time $D_{BS1}$ are determined based on time information in the third signal 303. The third signal 303 transmitted by the first base station BS1 may comprise information indicative of the first base station BS1 round trip time $R_{BS1}$ and a first base station BS1 delay time $D_{BS1}$, then the base station timings unit 404 is arranged to decode the information present in the third signal 303. In this way, the first base station BS1 provides device D with the first base station BS1 round trip time $R_{BS1}$ and the first base station BS1 delay time $D_{BS1}$ without requiring synchronised clocks across first base station BS1, second base station BS2 and device D. Optionally, when a fourth signal 304 is received by the base station timings unit 404 and comprises information indicative of the second base station BS2 round trip time $R_{BS2}$ and a second base station BS2 delay time $D_{BS2}$ then the base station timings unit 404 is arranged to decode the information present in the fourth signal 304.

In another non-limiting example, the first base station BS1 round trip time $R_{BS1}$ and the first base station BS1 delay time $D_{BS1}$ are determined based on time information in the third signal 303. The first signal 301 may comprise information indicative of a transmission time of the first signal 301 from the first base station BS1 and the third signal may comprise information indicative of a reception time of the second signal 302 at the first base station BS1 and information indicative of a transmission time of the third signal 303 from the first base station BS1. The base station timings unit 404 is arranged to receive the indications and calculate the first base station BS1 round trip time $R_{BS1}$ and the first base station BS1 delay time $D_{BS1}$ based on the indications. In particular, the base station timings unit 404 is arranged to calculate the first base station BS1 round trip time $R_{BS1}$ as the difference between the indication of time of reception of the second signal 302 and the indication of time of transmission of the first signal 301. In this way the first base station BS1 round trip time $R_{BS1}$ is calculated by device D in the time-base of the first base station BS1 and therefore synchronised clocks are not required across the first base station BS1, second base station BS2 and device D. Similarly, the base station timings unit 404 is arranged to calculate the first base station BS1 delay time $D_{BS1}$ as the difference between the indication of time of transmission of the third signal 303 and the indication of time of reception of the second signal 302. In this way, the relevant round trip times and delay times are calculated by the device D and not by the first base station BS1.

Optionally, the second signal 302 may comprise a time of reception at second base station BS2 of the first signal 301 and a time of transmission from the second base station BS2 of the second signal 302. Moreover, an optional fourth signal 304 may be received by the device D comprising an indication of a time of reception at second base station BS2 of the third signal 303. In this example, the base station timings unit 404 may be arranged to calculate the second base station BS2 round trip time $R_{BS2}$ and the second base station BS2 delay time $D_{BS2}$. In particular, the second base station BS2 delay time $D_{BS2}$ may be calculated as the difference between the indication of the time of transmission of the second signal 302 and the indication of the time of reception of the first signal 301. Moreover, the second base station BS2 round trip time $R_{BS2}$ may be calculated as the difference in time between the indication of the time of reception of the third signal 303 and the time of transmission of the second signal 302. In this way, the relevant round trip times and delay times are calculated by the device D and not by the second base station BS2.

The base station timings unit 404 is arranged to decode information from the signals in the relevant format in which the information is encoded. For example, if the signals rely on frequency modulation to encode Manchester encoded digital data then the base station timings unit 404 is arranged to decode the digital data by retrieving the Manchester encoded digital data from the frequency modulation and then further retrieving the digital data from the Manchester encoding. It is envisaged that other forms of modulation and encoding may be implemented and that the base station timings unit 404 is arranged to de-modulate and decode the digital or analogue data.

The calculating unit 405 is arranged to receive the delay time of the device $D_D$ from the delay time measuring unit 402, the round trip time of the device $R_D$ from the round trip time measuring unit 403 and the indications of the delay time of the first base station $D_{BS1}$ and round trip time of the first base station $R_{BS1}$ from the base station timings unit 404. Based on these received indications the calculating unit 405 is arranged to calculate a first time difference of arrival. As will be explained later with reference to FIG. 5, the calculated first time difference of arrival locates the device D on a hyperbola between the first base station BS1 and the second base station BS2. The present inventors have named their approach "Asymmetric Time Difference of Arrival" (ATDOA) because it relies on asymmetric signalling between the first base station BS1 and the second base station BS2, with the first base station BS1 transmitting two signals (first signal 301 and third signal 303) whilst the second base station BS2 only transmits one signal (the second signal 302).

In a non-limiting embodiment, the first time difference of arrival is calculated based on the delay time of the device $D_D$ from the delay time measuring unit 402, the round trip time of the device $R_D$ from the round trip time measuring unit 403 and the indications of the delay time of the first base station $D_{BS1}$ and round trip time of the first base station $R_{BS1}$ from the base station timings unit 404, the speed of light and an indication of a distance between the first base station BS1 and the second base station BS2. As will be appreciated, the speed of light varies depending on the medium in which the first base station BS1, second base station BS2 and the device D operate, therefore the calculation based on the speed of light is tailored based on the environment in which the device D operates. Advantageously, this non-liming embodiment provides the device D with the capacity to determine a physical distance as a position measured in, for example, metres in a one, two or three dimensional space relative to the first base station BS1 and the second base station BS2.

Moreover, the indication of distance between the first base station BS1 and second base station BS2 may be found in any number of ways. For example, the distance may be determined at installation of the first base station BS1 and second base station BS2 and the distance measured by any manual means with the device D being programmed with the distance measured. Instead, or in addition, the distance may be measured once the first base station BS1 and second base station BS2 are operational using a distance finding means such as the ranging algorithms described in the background section (for example, the ATWR technique). In this way, the device D can be informed, by way of another signal (not shown) which includes an indication of the distance between the first base station BS1 and the second base station BS2.

Figure 5:
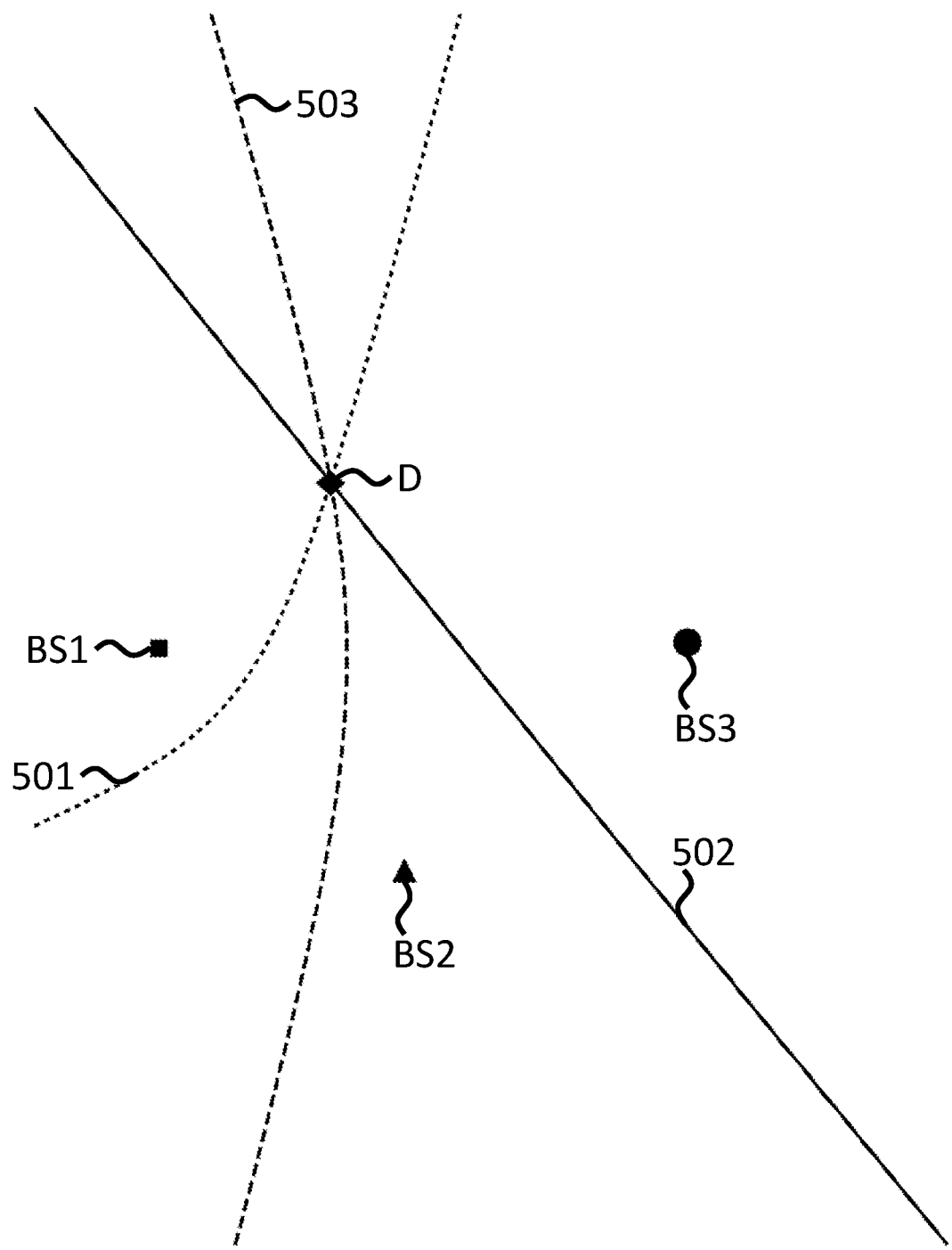
FIG. 5 is a schematic diagram of a device D of the first embodiment determining its position using a technique of the first embodiment.

With regard to FIG. 5, positioning using Asymmetric Time Difference of Arrival (ATDOA) in a two dimensional example is shown. As explained previously, each ATDOA measurement results in positioning the device D on a hyperbola between the two base stations exchanging signals. In the shown example, three ATDOA measurements are taken by device D between BS1 and BS2, BS2 and BS3, and BS1 and BS3 fixed base stations, which enable the identification of the position of the moveable device D by the intersection of hyperbolas 501, 502 and 503.

In particular, curve 501 pertains to possible ATDOA locations (in other words, a hyperbola) of device D based on the measured ATDOA from BS1 and BS2. Similarly, curve 502 pertains to possible ATDOA locations of device D based on the measured ATDOA from BS2 and BS3. Similarly, curve 503 pertains to possible ATDOA locations of D based on the measured ATDOA from BS1 and BS3.

Rather than measuring ranges from a single base station of known location, Asymmetric Time Difference of Arrival (ATDOA) relies on two base stations (first base station BS1 and second base station BS2) of known location to calculate the difference in time of flight (signal propagation time) of the first base station BS1 to the device D of unknown location and the second base station BS2 to the same device D. Such a measurement can be used to place the device D on a hyperbolic surface (in three dimensions), and with multiple such readings from different pairs of base stations and the same device D, taking the intersection of the resulting surfaces determines a position.

The present inventors have identified the following advantages of ATDOA over known positioning systems:
- Device D (the device of unknown location) does not need to send messages in order to collect ATDOA measurements and can thus calculate its position itself.
- The scalability characteristics of such a system are more favourable—a dense set of devices may locate their position without communicating in the presence of a smaller set of communicating base stations.
- Adding more devices within an area does not need any extra infrastructure to support location finding (in terms of extra base stations), nor commands extra communication overhead nor results in added latency for any other devices.
- The scheme is resilient to clock error, even with a typical crystal clock.

In particular, ATDOA is robust to clock error, even to the point where a temperature compensated crystal oscillator (TCXO) is not necessary to produce accurate ATDOA measurements—measurements accurate to 15 cm in initial prototypes suggest use of a crystal clock (which is more power efficient, cheaper and more readily available) is sufficient. This is further backed up by the mathematical analysis below which suggests that clock error would be contributing insignificantly to the noise in the readings of the prototype system.

The following discloses a mathematical analysis of Asymmetric Time Difference of Arrival (ATDOA) as described previously with regard to the device D of the first embodiment of the present invention.

Figure 6:
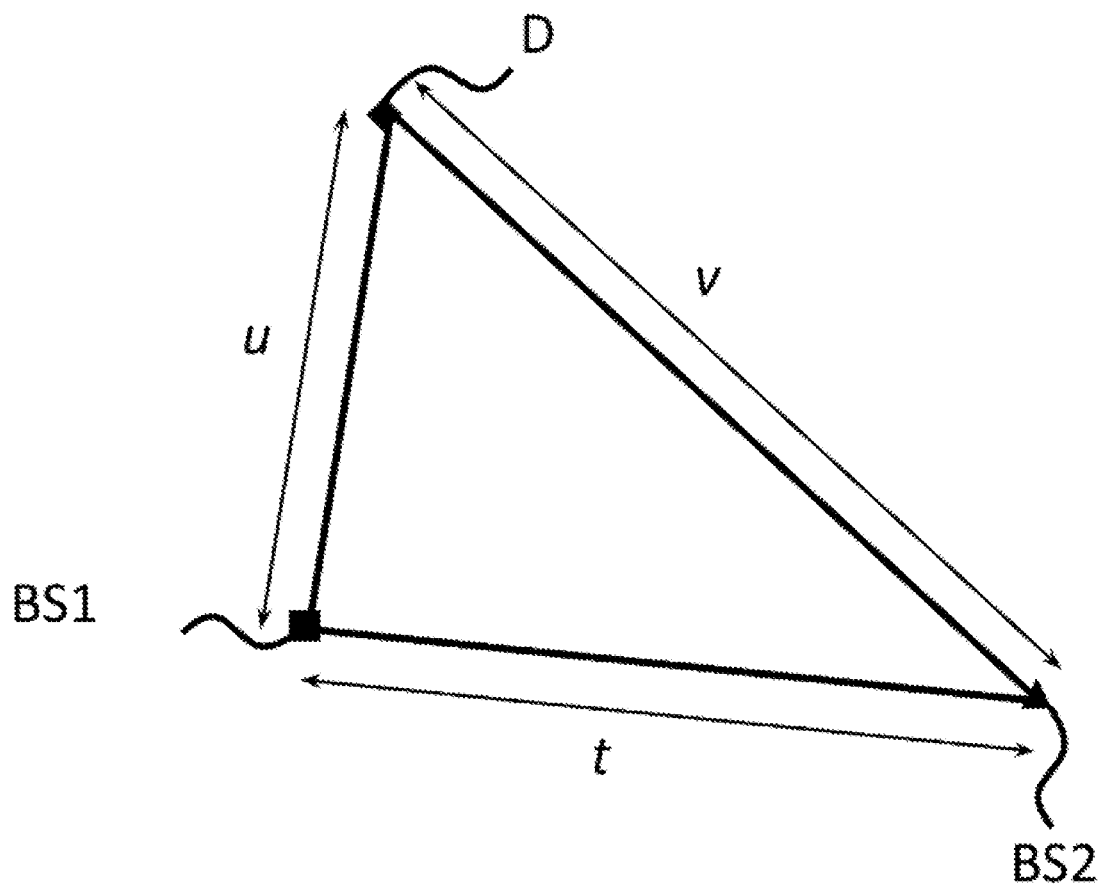
FIG. 6 is a schematic diagram of an example layout of a first base station BS1, second base station BS2 and device D with times of flight of signals between the entities depicted.

In the analysis which follows, three entities are setup, namely: a first base station BS1, a second base station BS2 and a device D, where c is the speed of transmission of signals, which typically corresponds with the speed of light. In particular, with reference to FIG. 6, times of flight of signals between each of the entities are shown with u, v and t being defined as follows:

$$u = \frac{1}{c}\|BS1 - D\| \tag{1}$$

$$v = \frac{1}{c}\|D - BS2\|$$

$$t = \frac{1}{c}\|BS1 - BS2\|$$

In this notation, the Time Difference of Arrival, TDOA, $\tau$ between BS1 and BS2 at D is defined to be:

$$\tau = u - v$$

The following described calculation for TDOA is both robust to clock drift and has good properties for calibrating antenna delay.

Figure 7:
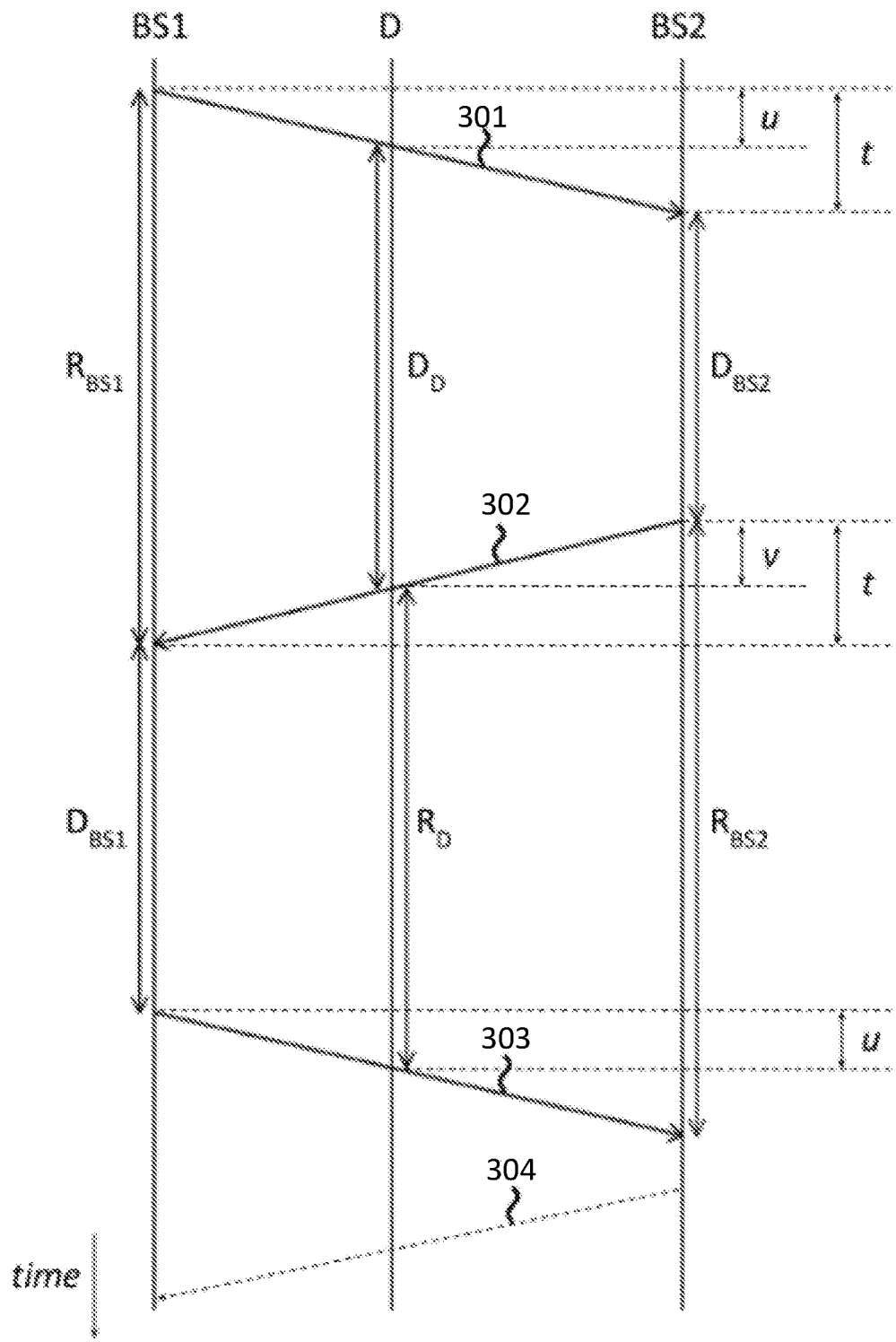
FIG. 7 is a corresponding signals diagram to FIG. 3 including additional detail of times of flight of signals between entities.

The aim of the analysis is to obtain an accurate measure of $w = t + u - v$. FIG. 7 is a diagram corresponding to FIG. 3 but showing times of flight of signals depicted between each of the entities. Using the known time t and an accurate approximation of w an accurate approximation of the TDOA $\tau$ between BS1 and BS2 at D can be obtained.

With reference to FIG. 7, the following equations are derived:

$$R_{BS1} = D_D u + (t-v) = D_D + w \tag{2}$$

$$R_D = D_{BS1} + (t-V) + u = D_{BS1} + w \tag{3}$$

Taking the product of $R_{BS1}$ and $R_D$ from Equations 2 and 3:

$$R_{BS1} R_D = (D_D + w)(D_{BS1} + w) \tag{4}$$

$$\Rightarrow R_{BS1} R_D - D_{BS1} D_D = w(D_D + D_{BS1} + w)$$

$$\Rightarrow w = \frac{R_{BS1} R_D - D_{BS1} D_D}{D_D + D_{BS1} + w}$$

From Equations 2 and 3 respectively two forms, $w_{BS1}$ and $w_D$, for w are obtained:

$$w_{BS1} = \frac{R_{BS1} R_D - D_{BS1} D_D}{R_{BS1} + D_{BS1}} \tag{5}$$

$$w_D = \frac{R_{BS1} R_D - D_{BS1} D_D}{R_D + D_D} \tag{6}$$

It is then easy to recover an accurate approximation for T given either of these accurate approximations $w_{BS1}$ or $w_D$ by subtracting t (from equation 1).

With regard to robustness to clock drift, utilising the same notation as disclosed by Neirynck et al in "An Alternative Double-Sided Two-Way Ranging Method" from 21 Oct. 2016, which is incorporated herein by reference, the following analysis for clock drift is performed. Assume that device D, first base station BS1, second base station BS2 have clocks which are accurate to $e_D$, $e_{BS1}$, $e_{BS2}$ parts per million respectively and consider the impact on measured interval $\hat{I}$ versus actual interval I, where, for example, $\hat{R}_D$ is the measured form of $R_D$.

For convenience, write $k_D = 1 + e_D$, and similarly for each of first base station BS1 and second base station BS2.

First, looking at the measurement of $w_{BS1}$ $$\hat{w}_{BS1} = \frac{\hat{R}_{BS1}\hat{R}_D - \hat{D}_{BS1}\hat{D}_D}{\hat{R}_{BS1} + \hat{D}_{BS1}} \quad (7)$$

$$= \frac{(k_{BS1}R_{BS1})(k_D R_D) - (k_{BS1}D_{BS1})(k_D D_D)}{(k_{BS1}R_{BS1}) + (k_{BS1}D_{BS1})}$$

$$= \frac{k_{BS1}k_D}{k_{BS1}} \frac{R_{BS1}R_D - D_{BS1}D_D}{R_{BS1} + D_{BS1}}$$

$$= k_D w_{BS1}$$

$$\Rightarrow \hat{w}_{BS1} - w_{BS1} = e_D w_{BS1}$$

Alternatively, looking at the measurement of $w_D$ $$\hat{w}_D = \frac{\hat{R}_{BS1}\hat{R}_D - \hat{D}_{BS1}\hat{D}_D}{\hat{R}_D + \hat{D}_D} \quad (8)$$

$$= \frac{(k_{BS1}R_{BS1})(k_D R_D) - (k_{BS1}D_{BS1})(k_D D_D)}{(k_D R_D) + (k_D D_D)}$$

$$= \frac{k_{BS1}k_D}{k_D} \frac{R_{BS1}R_D - D_{BS1}D_D}{R_D + D_D}$$

$$= k_{BS1} w_D$$

$$\Rightarrow \hat{w}_D - w_D = e_{BS1} w_D$$

Therefore, given the order of magnitude of both $w_{BS1}$ and $w_D$ is small, the errors $(\hat{w}_{BSD1} - w_{BS1})$ and $(\hat{w}_D - w_D)$ in their measurement due to clock errors $e_D$ and $e_{BS1}$ respectively is small.

Specifically, the definition of $w=t+u-v$ implies $w_{BS1}$ and $w_D$ must be in the order of $10^{-6}$ for a system covering 100 metres. With standard crystal clocks accurate to ±20 parts per million (as also stipulated in the IEEE 802.15.4a standard), the error is of the order of $$\pm ew = \pm(20\times 10^{-6})(10^{-6}) = \pm 2\times 10^{-13} \text{ seconds} = \pm 6\times 10^{-5} \text{ metres}$$

This model of clock error suggests sub-millimetre accuracy, though, in practice, this implies that clock error in such systems with this algorithm will not affect the accuracy of the measurement of w.

It is also important to consider the impact of antenna delay and receive signal level bias. More specifically, one extra pair of factors on the performance of an UWB positioning scheme are transmit and receive antenna delay. This concept is disclosed in "APS014: Antenna Delay Calibration of DW1000, APS012: DW1000 Production Tests, APS011: Sources of error in TWR schemes" by Decawave which is incorporated herein by reference. Beyond antenna delay, there is also a further impact of Receive Signal Level (RSL).

Figure 8:
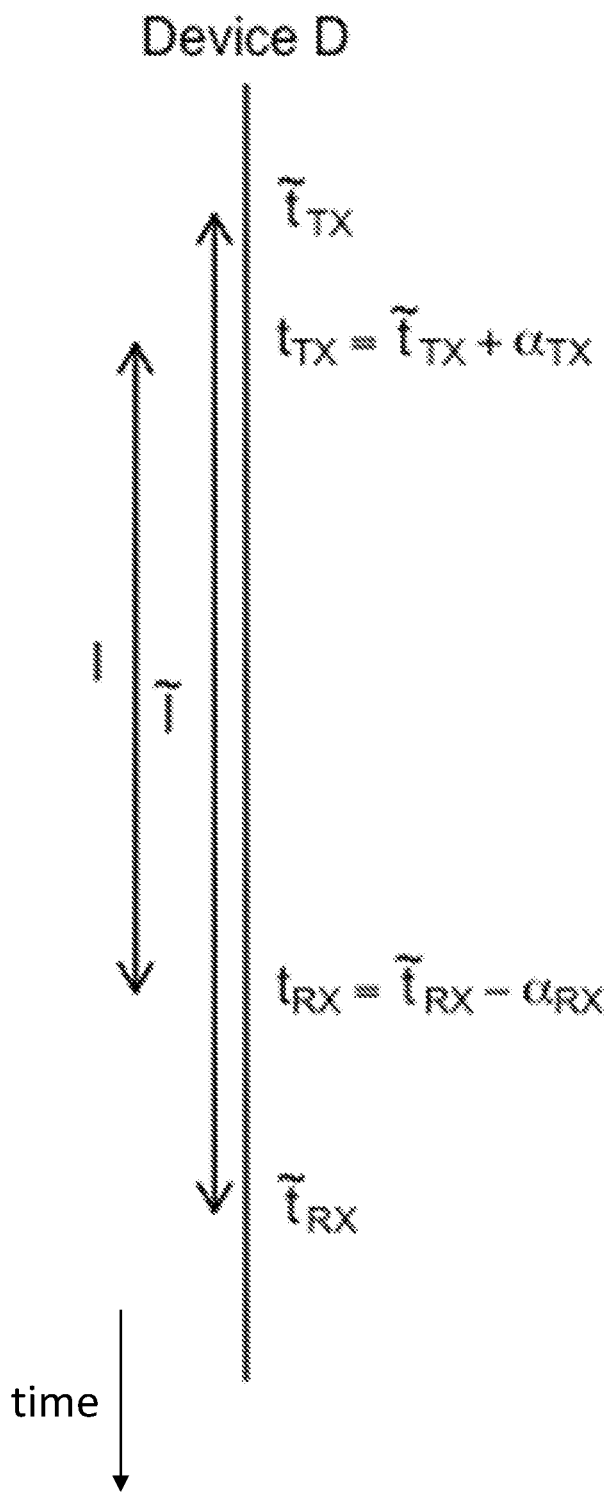
FIG. 8 is a signals diagram for a device showing the effects of antenna delay.

With regard to FIG. 8, it is important to determine the impact of antenna delays on intervals measured by all of a device D, a first base station BS1 and a second base station BS2. Consider two parameters, $\alpha_D^{TX}$ and $\alpha_D^{RX}$, respectively the transmit and receive antenna delay for device D, which informally represent the delay between either a requested transmit time for a message and the actual time it is sent, or the actual receipt time of a message and the time it is noted to have been received. Simultaneously consider for first base station BS1 $\alpha_{BS1}^{TX}$ and $\alpha_{BS1}^{RX}$ and for second base station BS2 $\alpha_{BS2}^{TX}$ and $\alpha_{BS2}^{RX}$. The analysis will now consider which of these will require calibration.

In the notation below, a tilde over a variable (e.g. $\tilde{\tau}$) will be used to indicate that this is the measurement of the variable by the system which will take into account antenna delay. The following examines the effect of measurement of an interval I by first base station BS1 taking into account the parameters $\alpha_{BS1}^{TX}$ and $\alpha_{BS1}^{RX}$.

Suppose that a message request is sent from first base station BS1 at time $\tilde{t}_{TX}$. Suppose that after a delay of $\alpha_{BS1}^{TX}$ the message is actually sent, so $$t_{TX} = \tilde{t}_{TX} + \alpha_{BS1}^{TX}$$

Further suppose later a message is received at first base station BS1 at time $t_{RX}$, but due to a Receive Antenna Delay of $\alpha_{BS1}^{RX}$, receipt of that message is not noted until $\tilde{t}_{RX}$, so that $$t_{RX} = \tilde{t}_{RX} - \alpha_{BS1}^{RX}$$

With reference to FIG. 8, the measured duration, $\tilde{I}$, is compared to the actual duration I therefore:

$$\tilde{I} = \tilde{t}_{RX} - \tilde{t}_{TX} \quad (9)$$

$$= (t_{RX} - t_{TX}) + (\alpha_{BS1}^{RX} + \alpha_{BS1}^{TX})$$

$$= I + \alpha_{BS1}$$

where $$\alpha_{BS1} = \alpha_{BS1}^{TX} + \alpha_{BS1}^{RX}$$

is the composite antenna delay for first base station BS1.

Similarly, examining the measurement $\tilde{I}'$ of an interval $I'$ between a message received first at first base station BS1 and a message transmitted second at first base station BS1:

$$\tilde{I}' = I' - \alpha_{BS1}$$

Note that for an interval measurement at first base station BS1 between two receive timestamps, there is no impact of Antenna Delay (at least, provided the small impacts of temperature not accounted for/modelled). The same observation applies if an interval measurement is between two transmit timestamps.

Moreover, with regard to the antenna delay in ATDOA, the same antenna delay interval measurement analysis applies for second base station BS2 and device D in the ATDOA scheme with composite antenna delays $\alpha_{BS2}$, and $\alpha_D$ respectively.

Then, according to Equation 6, for $w_D$, let us consider its measurement $\tilde{w}_D$. Substituting in the impact of antenna delay on the intervals measured in the first base station BS1 and the device D $$\tilde{w}_D = \frac{\tilde{R}_{BS1}\tilde{R}_D - \tilde{D}_{BS1}\tilde{D}_D}{\tilde{R}_D + \tilde{D}_D} \quad (10)$$

$$= \frac{(R_{BS1} + \alpha_{BS1})R_D - (D_{BS1} - \alpha_{BS1})D_D}{R_D + D_D}$$

$$= \frac{(R_{BS1}R_D - D_{BS1}D_D) + \alpha_{BS1}(R_D + D_D)}{R_D + D_D}$$

$$= w_D + \alpha_{BS1}$$

From this, it ought to be simple to calibrate the antenna delay for the system: in a system comprising first base station BS1, second base station BS2, and device D, just calibration of $\alpha_{BS1}$ is needed, the composite antenna delay at BS1 to handle antenna delay. Then note that $\alpha_{BS1}$ is easily obtained by placing first base station BS1, second base station BS2 and device D in known positions, averaging many measurements, and solving the linear equation resulting from Equation 10.

It should be noted that ATDOA has the advantageous property over ATWR with respect to the antenna delay calibration that only one entity requires calibration. Specifically, in ATDOA the device D does not require calibration. For example, the entity may be one of the device D, the first base station BS1 or the second base station BS2.

Additionally, calibrating for antenna delay in ATWR requires three entities to be placed equidistant in a triangle formulation and execute an ATWR technique between each of the pairs of entities in order to solve the equations disclosed by Decawave in 2014 in the document "APS014 Application Note Antenna Delay Calibration of DW1000-based Products and Systems", version 1.01, which is incorporated herein by reference. On the other hand, it should be noted that the calibration for ATDOA requires no superfluous entities or solving of more complicated simultaneous equations.

With regard to receive signal level (RSL) bias, according to "APS014: Antenna Delay Calibration of DW1000, APS012: DW1000 Production Tests, APS011: Sources of error in TWR schemes, Decawave Documentation" by Decawave, which is incorporated herein by reference, "a bias which varies with received signal level (RSL) can be observed in the reported time-stamp compared with the correct value". Therefore, it is possible to suppose that for first base station BS1, second base station BS2 and device D there exists RSL bias functions $\delta_{BS1}(x)$, $\delta_{BS2}(x)$ and $\delta_D(x)$ for x being the RSL (or alternatively, for a fixed setup and abusing notation, x is an entity from which a signal is sent to BS1, BS2, or D respectively).

Now expand the model for $\tilde{w}_D$, observing the following revised equations:

$$\tilde{R}_{BS1} = R_{BS1} + (\alpha_{BS1} + \delta_{BS1}(BS2))$$

$$\tilde{R}_D = R_D + (\delta_D(BS1) - \delta_D(BS2))$$

$$\tilde{D}_{BS1} = D_{BS1} - (\alpha_{BS1} + \delta_{BS1}(BS2))$$

$$\tilde{D}_D = D_D - (\delta_D(BS1) - \delta_D(BS2)) \quad (11)$$

Thus the revised form of $\tilde{w}_D$ is:

$$\begin{aligned}\tilde{w}_D &= \frac{\tilde{R}_{BS1}\tilde{R}_D - \tilde{D}_{BS1}\tilde{D}_D}{\tilde{R}_D + \tilde{D}_D} \quad (12)\\ &= \frac{(R_{BS1} + (\alpha_{BS1} + \delta_{BS1}(BS2)))(R_D + (\delta_D(BS1) - \delta_D(BS2)))}{(R_D + (\delta_D(BS1) - \delta_D(BS2))) + (D_D - (\delta_D(BS1) - \delta_D(BS2)))} \\ &\quad - \frac{(D_{BS1} - (\alpha_{BS1} + \delta_{BS1}(BS2)))(D_D - (\delta_D(BS1) - \delta_D(BS2)))}{(R_D + (\delta_D(BS1) - \delta_D(BS2))) + (D_D - (\delta_D(BS1) - \delta_D(BS2)))} \\ &= \frac{R_{BS1}R_D - D_{BS1}D_D + (\delta_D(BS1) - \delta_D(BS2))(R_{BS1} + D_{BS1}) + (\alpha_{BS1} + \delta_{BS1}(BS2))(R_D + D_D)}{R_D + D_D} \\ &= w + \delta_D(BS1) - \delta_D(BS2) + \alpha_{BS1} + \delta_{BS1}(BS2)\end{aligned}$$

A first technique of compensating for RSL bias may be obtained by configuring a test bed such that D is equidistant to both BS1 and BS2, $\delta_D(BS1) \neq \delta_D(BS2)$ and so $\alpha_{BS1} + \delta_{BS1}(BS2) \approx \tilde{w}_D - w$. In this way, it is appreciated that the function $\delta_{BS1}$ may be approximated by repeated measurement and adjustment of the test bed.

Specifically, by fixing $\alpha_{BS1}$ (say by using above Antenna Delay calibration in the preceding section), it is possible to calibrate the function $\delta_{BS1}(x)$ by moving first base station BS1 and second base station BS2 symmetrically out from device D. As the equations show, any inaccuracy in the rough calibration of the antenna delay $\alpha_{BS1}$ will be corrected by the function $\delta_{BS1}(x)$.

Further, on the assumption that BS1 and D are of suitably similar design and manufacture, it is possible to suggest that $\delta_D(x) \approx \delta_{BS1}(x) + \gamma$ for some constant $\gamma$ representing the component of $\alpha_{BS1}$ not accurately captured in the previous calibration of the antenna delay.

By then considering $\delta_D(x) - \delta_D(\gamma) = (\delta_{BS1}(x) + \gamma) - (\delta_{BS1}(\gamma) + \gamma) = \delta_{BS1}(x) - \delta_{BS1}(\gamma)$, it is possible to note the function $\delta_D(x)$ only appears as in the form $\delta_D(x) - \delta_D(\gamma)$ hence it does not matter that the constant bias term $\gamma$ is not determined, and thus using $\delta_{BS1}$ for the function $\delta_D$ is sufficient.

It is suggested that the initial calibration of the antenna delay $\alpha_{BS1}$ is done at a set distance/RSL in order to be able to redeploy the function $\delta_{BS1}$, once learnt, in other entities performing similar functions to that of BS1 without the need to perform further calibration of the RSL bias function. Instead, it would suffice for those new entities to be calibrated for antenna delay at that same fixed distance/RSL.

It should also be noted that it is understood that the RSL bias functions will also vary depending on the channel used and the Pulse Repetition Frequency (PRF) setting employed.

However, in some situations, directly measuring the received signal strength as the inputs to the functions $\delta_{BS1}(x)$, $\delta_{BS2}(x)$ and $\delta_D(x)$ is not sufficient to accurately compensate for RSL bias. Specifically, entities engineered for accurate measurement of time may not be engineered for accurate measurement of signal strength. As described later with reference to multilateration a second technique of RSL bias compensation is disclosed with advantageous properties to the first technique described above.

Moreover, one method of attempting to improve accuracy in existing TDOA systems is to perform clock synchronization between base stations using fixed cables, clock repeaters, and such. This detracts from the elegance of the system and also increases the cost of infrastructure. In contrast, the ATDOA method assumes clocks are not synchronized, potentially removing the possibility for expensive and inconvenient cabling being required.

Referring back to the calculating unit 405, In a non-limiting preferred embodiment, the calculating unit 405 may further receive the delay time of the device $D_D$ from the delay time measuring unit 402, the round trip time of the device $R_D$ from the round trip time measuring unit 403 and the optionally determined indications of the delay time of the second base station $D_{BS2}$ and round trip time of the second base station $R_{BS2}$ from the base station timings unit 404. Based on these received indications the calculating unit 405 is optionally arranged to calculate a second time difference of arrival which places the device D on a hyperbola between the second base station BS2 and the first base station BS1.

In a preferred embodiment, the second time difference of arrival is calculated based on the delay time of the device $D_D$ from the delay time measuring unit 402, the round trip time of the device $R_D$ from the round trip time measuring unit 403 and the indications of the delay time of the second base station $D_{BS2}$ and round trip time of the second base station $R_{BS2}$ from the base station timings unit 404, the speed of light and an indication of a distance between the second base station BS2 and the first base station BS1. As will be appreciated, the speed of light varies depending on the medium in which the first base station BS1, second base station BS2 and the device D operate, therefore the calculation based on the speed of light is tailored based on the environment in which the device D operates.

By including the measurements from the second base station BS2 small gains in accuracy can be added without additional latency or significant communication overhead.

In equations 5 and 6, the above calculation of ATDOA was presented using the intervals measured on the first base station BS1 and device D. In this specific scheme, it is therefore clear that the device D can immediately calculate w given the intervals marked ($R_{BS1}$, $D_{BS1}$, $R_D$, $D_D$).

However, by adding the intervals $R_{BS2}$ and $D_{BS2}$, the average of the two expressions for w (for example) may lead to a "better"/less noisy result. Using w'=t+v−u=t−τ:

$$w' = \frac{R_{BS2}D_D - D_{BS2}R_D}{R_{BS2} + D_{BS2}} \quad (13)$$

Furthermore, noting that τ=w−t=t−w', a new approximation for T is obtained:

$$\tau = w - t = t - w' \quad (14)$$
$$\Rightarrow \tau = \frac{1}{2}[(w-t)+(t-w')]$$
$$\Rightarrow \tau =$$
$$\frac{1}{2}(w - w') = \frac{1}{2}\left(\frac{R_{BS1}R_D - D_{BS1}D_D}{R_{BS1} + D_{BS1}} - \frac{R_{BS2}D_D - D_{BS2}R_D}{R_{BS2} + D_{BS2}}\right)$$

As will be appreciated, a similar calibration for $\alpha_{BS2}$ as was previously described with regard to $\alpha_{BS1}$ may be performed utilising the fourth signal 304 previously described.

In a preferred embodiment, the device D further comprises an optional transmitting unit 406. This has the effect of causing the device D to behave in a manner similar that of a base station in that the device D is capable of transmitting at least one signal to the first base station BS1 and/or second base station BS2 and/or other devices D which also comprise the optional transmitting unit 406.

Thereafter, the device D comprising the optional transmitting unit 406 can assist in the positioning of other devices D whose position remains unknown.

The device D may start with no prior knowledge of its positioning. The device D is arranged to receive signals from other base stations (with known positions) so that the device D can determine its position. As will be appreciated, the exact position of the device D need not be determined so long as the other devices D learned relative distances of this device D to some of the base stations and/or other devices D comprising the optional transmitting unit 406.

This may be of help in either increasing the number of ATDOA readings available to devices D, or to assist in areas which are out of range of many of the base stations. In this way, it could also be used to reduce the number of stations placed within the perimeter of an environment (perhaps reducing this number to zero), which may be convenient for reasons of power supply, maintenance and other engineering reasons.

In one non-limiting example, the transmitting unit 406 may be arranged to transmit at least one signal comprising information indicative of a measured round trip time and a measured delay time. Accordingly, the transmitting unit 406 makes the device D operate in a manner to similar to the base stations described previously. Alternatively or in addition, the transmitting unit 406 may be arranged to transmit at least one signal comprising information indicative of a time of transmission of the at least one signal from the device D. Similarly, this operation makes the device operate in a manner similar to that of a base station described previously.

In a further non-limiting example, the device D may further comprise an averaging unit 407 which is arranged to receive at least two time differences of arrivals from the calculating unit 405 and arranged to performing an averaging function on the at least two time difference of arrivals. In this way, by modelling the noise (say as a Gaussian component of the measurement), it may be possible to reduce the noise by statistical techniques (for example averaging). This risks increasing the latency of the system, but may still be of use in some configurations.

In one example, the averaging unit 407 may be arranged to receive the first and second time difference of arrivals from the calculating unit 405, which were calculated based on the measurements from the first base station BS1 and the measurements from the second base station BS2, respectively. The averaging unit 407 may be further arranged to average the first and second time difference of arrivals.

Alternatively or in addition, it may be possible to capture multiple ATDOA readings whilst the device D is stationary from the same set of base stations. For example, obtaining repeated time difference of arrivals from the signals of the first base station BS1 and the second base station BS2, in other words, capturing the first time difference of arrival repeatedly and then averaging the repeated measurement.

Although the above description describes one device D and two base stations, the present inventors envisage at least one device D operating in an environment with at least two base stations. As will be appreciated, to determine the exact position of a device D of unknown position in three dimensional space requires more than two base stations. For example, as depicted in FIG. 5 showing a two dimensional solution, three base stations are required to obtain at least two hyperbolas (although a third hyperbola may also be determined between the first base station BS1 and the third base station BS3), the intersection of which is the location of device D. As will be appreciated, in three dimensions at least three base stations are required so that the intersection in three dimensional space of the three hyperbolas determined by pairs of base stations intersect at a single point.

As shown in FIG. 5, for each of the base station pairs a hyperbola is shown of potential device D positions based on the time difference of arrivals calculated by device D. As will be appreciated, to achieve this, each of the three base stations are arranged to transmit signals to and receive signals from any other base station. The device D is arranged to receive the signals transmitted between any of the base stations and calculate a time difference of arrival based on the received signals.

In a further preferred embodiment, the present inventors have found that a useful solution for determining the position of a device D is to utilise multilateration. Accordingly, in a preferred embodiment a determining unit 408 is arranged to determine the position of the device D utilising multilateration. Good multilateration depends on the device D receiving at least two time difference of arrivals and calculating the position of device D by multilateration of the received at least two time differences of arrivals.

In one example, the device may utilise constraints known about its environment to determine its position with fewer time difference of arrivals and/or time difference of arrivals based upon less reliable information. For example, if the device D is known to operate within a certain area of an environment such as a 10 m by 10 m area then hyperbolas of position outside of this area can be disregarded to limit the hyperbola crossing point and thereby the position of device D to a specific area within the environment. Similarly, if the device D is known to operate only in a two dimensional area and to not perform any vertical motions then hyperbolic surfaces extending above and below the operating area can be disregarded. In this way, the device D calculates its position based on the received time difference of arrivals and information indicative of the constraints of the environment in which the device D is positioned. Moreover, as previously described, multilateration may be performed utilising the time difference of arrivals and information indicative of a receive signal bias.

More specifically, optimisation techniques may be employed to perform multilateration from ATDOA values and the configuration of base stations.

First, assume a set of n fixed base stations, $\{A_1, A_2, \ldots, A_n\}$ with known positions $\{p(A_1), p(A_2), \ldots, p(A_n)\}$ respectively.

Second, below is a method of calculating expected ATDOA values given two fixed base stations $A_k$ and $A_l$, and a device T with position $p(T)$:

$$\tau(A_k, A_l, T) = \|p(A_k) - p(T)\| - \|p(A_l) - p(T)\|$$

Third, for a set of N measurements of ATDOA at a device T of unknown location $p(T)$:

$$\mathcal{M} = \{m(A_{i_1}, A_{j_1}, T), m(A_{i_2}, A_{j_2}, T), \ldots, m(A_{i_N}, A_{j_N}, T)\}$$

Note that there may be multiple measurements in $\mathcal{M}$ for a given pair of fixed base stations $(A_k, A_l)$.

To optimize, look to find a T' (i.e. a configuration of a device with a position p(T')) which matches the measurements $\mathcal{M}$.

Fourth, a means of evaluating the error in a current candidate T' with respect to the measurements $\mathcal{M}$ is needed. For example:

$$\text{error}(\mathcal{M}, T') = \sum_{m(A_k, A_l, T) \in \mathcal{M}} [m(A_k, A_l, T) - \tau(A_k, A_l, T')]^2$$

Fifth, a method for optimisation is needed—there are many of these about, but they all aim to find some value (in our case, T') that minimises some objective (in this case, error($\mathcal{M}$, T')).

If the optimiser does its job correctly and the measurements $\mathcal{M}$ are good, a T' is found which matches with low error error($\mathcal{M}$, T').

Sixth, optimisation algorithms typically need a couple more parameters to work.

As such, some bounds to the problem may need to be provided (e.g., device T took its measurements within a defined area, perhaps with simple bounds on its coordinates), an initial candidate configuration of T' to work from, and other configuration regarding precision of output, convergence criteria, and other similar controls.

In this regard, selection of a good value for T' may be considered. To this end, if recent successful multilaterations have produced a location then a good candidate configuration of T' may be to use this location for p(T'). However, in some circumstances, including when there is no recent location estimate, it is often advantageous that an initial configuration of T' be chosen such that p(T') is located centrally within a polygon defined by the relevant base stations. For example, a polygon formed by the base stations BS1, BS2 and BS3 (each of which acting as a corner of the polygon thereby forming a triangle) then the centroid thereof may be used for the position p(T') in an initial candidate configuration of T'.

A second technique of RSL bias compensation is disclosed with advantageous properties to the first technique described previously. In particular, the advantageous second technique relies on compensation of RSL bias by way of measurement of time.

In particular, it is apparent that in the formula for T, what is captured is what is expected to be measured, rather than what would be theoretically measured in a system where there were no Antenna Delays, RSL biases or clock issues. As such, given a function δ(x) which captured the RSL bias for a signal received from a distance x, then through use of an alternate form τ' to the function T which captures the RSL bias, a position of T is matched with the set of measurements $\mathcal{M}$:

$$\tau'(A_k, A_l, T) = \tau(A_k, A_l, T) + \delta(\|p(A_k) - p(T)\|) - \delta(\|p(A_l) - p(T)\|) + \delta(\|p(A_l) - p(A_k)\|)$$

The advantage of this second technique is that it is possible to apply an RSL bias correction without having to measure receive signal strength. This places one less requirement on hardware—namely that it need not be good at measuring receive signal strength, which is fortunate because the present inventors have found that the DW1000 chip is not well equipped to measure receive signal strength.

In order to obtain the function δ, it is necessary to change to the simpler technique of Two-Way Ranging. In particular, Decawave, in the 2014 document, "APS011 Application Note Sources of Error in DW1000 based Two-Way Ranging (TWR) Schemes", version 1.0, incorporated herein by reference, disclose that as per existing examples in the TWR field, it is possible to compensate for RSL bias relatively simply. More specifically, page 10, section 3.2 of this document discloses the handling of RSL bias utilising a simple lookup table to correct ranges. However, the present inventors have found that for determining the time of flight $T_f$ between two entities at points $P_1$ and $P_2$ by TWR an appropriate model $\tilde{T}_f$ of its measurement incorporating RSL bias is:

$$\tilde{T}_f = T_f + \delta(\|P_2 - P_1\|)$$

The present inventors have found that it is therefore sufficient to calibrate δ by first producing a function δ' which is a mapping from measured distances to a correction factor to obtain actual distances (built by recording many measurements $\tilde{T}_f$ for many distances $T_f = \|P_2 - P_1\|$ between the points, and averaging the errors $(\tilde{T}_f - T_f)$ for each distance). In this way, on average:

$$\tilde{T}_f - \delta'(\tilde{T}_f) = T_f$$

The present inventors have further found that the function δ may then be defined by the desired property that for each distance x, it is expected to measure a distance $\tilde{x} = x + \delta(x)$ (including range bias effects) such that:

$$\tilde{x} - \delta'(\tilde{x}) = x$$

i.e. a measured distance $\tilde{x}$ corrected by δ' is the same as the true distance x Therefore δ(x) is computed such that:

$$\delta(x) = \tilde{x} - x = \delta'(\tilde{x}) = \delta'(x + \delta(x))$$

Finally, note that this technique therefore does not require any accurate measure of signal strength, and yet can account for RSL biases in ATDOA during multilateration.

Figure 4:
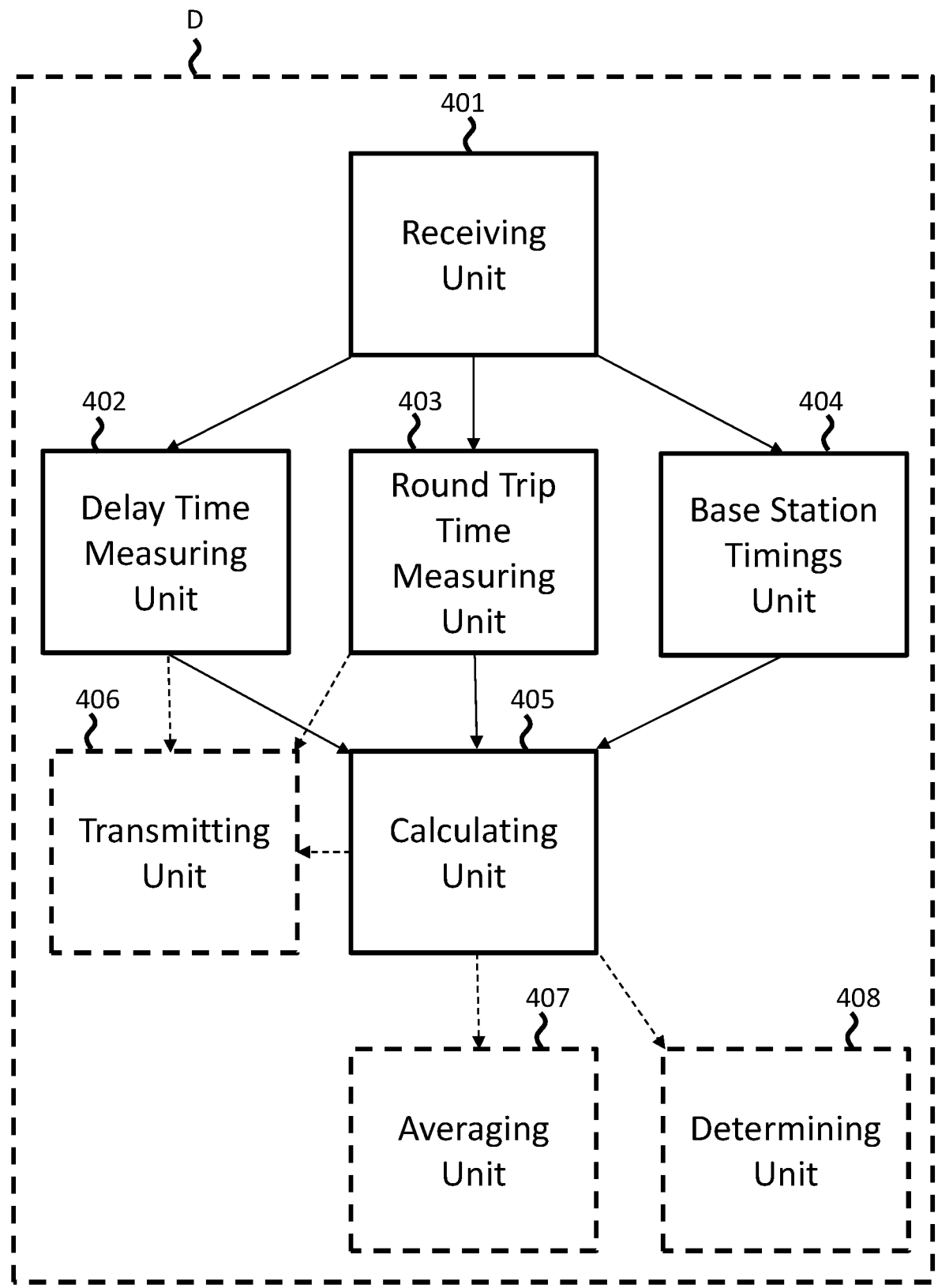
FIG. 4 is a schematic diagram showing a device operating in a communication system according to a first embodiment of the present invention.
Figure 9:
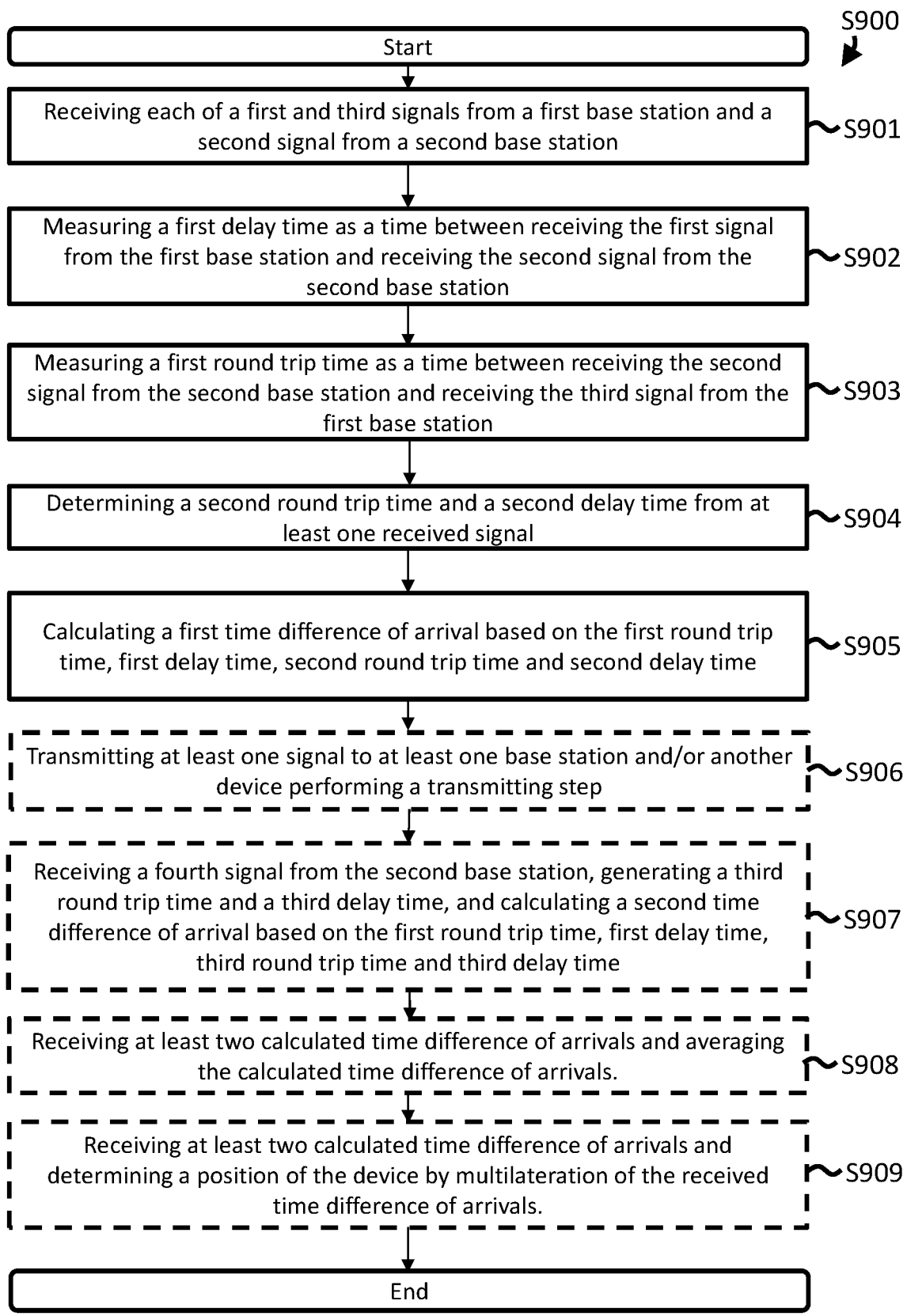
FIG. 9 is a flowchart showing the process performed by the device according to the first embodiment of the present invention.

FIG. 9 shows the processes performed by the device D according to the first embodiment as shown in FIG. 4. In particular, the flowchart shows the calculation of a time difference of arrival for the device D based on signals transmitted between a first base station BS1 and a second base station BS2.

As described previously, the first base station BS1 and second base station BS2 are arranged to communicate with one another try transmitting a series of signals, namely a first signal 301, second signal 302 and third signal 303, as shown in FIG. 3. Optionally, a fourth signal 304 is transmitted between the first base station BS1 and the second base station BS2.

The device D is arranged to receive each of the signals and arranged to determine at least one time difference of arrival based on the received signals.

In particular, at step S901, the device D receives each of a first and third signals from a first base station and a second signal from second base station. As explained previously, the signals may comprise no information, an indication as to which numbered signal they are, information regarding a measured delay time or measured round trip time from the base station or an indication of a time of transmission or reception of a signal at a base station. Accordingly, the device D receives information necessary to calculate a time difference of arrival. In one non-limiting example, all of this calculation is performed at the device D, for example, when the device D receives information indicative of times of transmission or reception of signals at each base station. In another non-limiting example, only some of the calculation is performed at the device D which occurs when the device D receives a measured round trip time and/or a delay time of a base station from a base station which thereby reduces the computation load on the device D because it is not necessary for the device D to calculate these measured times.

At step S902, the device D measures a first delay time based on the received first signal and second signal. In particular, the device D measures the time difference between receiving the second signal from the second base station and the first signal from the first base station. A number of options for measuring the time are envisaged. For example, the device D may record the time in the time-base of device D at which the first signal is received and record the time in the time-base of device D at which the second signal is received. Accordingly, the device D can determine the difference in time between the two receptions and thereby determine the first delay time. Alternatively, the device D may utilise a timer which is reset to zero and started on reception at device D of the first signal. The timer will continue to run whilst the device D waits for the reception of the second signal. When the second signal is received the device D will stop the timer and read the value of the timer which indicates the time difference between receiving the first signal and receiving the second signal.

At step S903, the device D measures a first round trip time based on the received second signal and third signal. In particular, the device D measures the time difference between receiving the third signal from the first base station and the second signal from the second base station. A number of options for measuring the time are envisaged. For example, the device D may record the time in the time-base of device D at which the second signal is received and record the time in the time-base of device D at which the third signal is received. Accordingly, the device D can determine the difference in time between the two receptions and thereby determine the first round trip time. Alternatively, the device D may utilise a timer which is reset to zero and started on reception at device D of the second signal. The timer will continue to run whilst the device D waits for the reception of the third signal. When the third signal is received the device D will stop the timer and read the value of the timer which indicates the time difference between receiving the second signal and receiving the third signal.

At step S904, the device D determines a second round trip time and a second delay time from at least one received signal. In particular, the determined second round trip time and second delay time relate to round trip times and delay times of a base station, for example, the first base station. In one non-limiting example, the second round trip time and second delay time are determined by decoding information in the third signal. In particular, when the first base station is arranged to encode information in the third signal relating to the second round trip time and the second delay time, step S904 decodes it. In this example, the first base station BS1 performs the calculation of the second round trip time and second delay time. With regard to the second round trip time, the first base station BS1 measures the time between transmitting the first signal to the first base station BS1 and receiving the second signal from the second base station BS2. Similarly, the first base station BS1 measures the second delay time by measuring a time between receiving the second signal from the second base station BS2 and transmitting the third signal to the second base station BS2. The measured second round trip time and second delay time are encoded in the third signal as it is transmitted. In this way, the device D need not perform detailed calculation and instead can decode the information from the third signal.

Alternatively, the device D may perform the calculation of the second round trip time and the second delay time. In this example, the first base station BS1 transmits the first signal with an indication of time in the time-base of the first base station BS1 of the time of transmission. Similarly, the first base station BS1 transmits the third signal with an indication of a time of reception of the second signal and a time of transmission of the third signal. In this way, the device D can calculate the second round trip time and second delay time based on the received indications. In particular, the second round trip time can be calculated based on the difference in time of the indication of the time of transmission of the first signal and the time of reception of the second signal. Similarly, the second delay time can be calculated as the difference in time of the indication of the time of reception of the second signal and the time of transmission of the third signal. As will be appreciated, it is not essential that the indication of the time of transmission of the first signal is included in the first signal. Instead, the indication of the time of transmission of the first signal may instead be included in the third signal. In this way, the third signal comprises all of the information need for the device D to calculate the second round trip time and the second delay time. In particular, the third signal may comprise an indication of a time of transmission of the first signal and the third signal as well as an indication of a time of reception of the second signal.

At step S905, the device D calculate a first time difference of arrival based on the measured first round trip time, measured first delay time, determined second round trip time and determined second delay time. In particular, the previously provided equations provide a calculation which allows the device D to calculate its position as a hyperbola between the first base station BS1 and the second base station BS2. In a preferred embodiment, the calculation is also performed taking into account the speed of light in the environment in which the device D is operating and an indication of a distance between the first base station BS1 and the second base station BS2. As will be appreciated, a number of way of determining the difference are envisaged, such as manually measuring the distance with a ruler/tape measure or the like. Alternatively, an automatic distance finding system may be used such as ATWR as described in the background section. The distance may be programmed into the device D before operation or otherwise transmitted to the device before performing a time difference of arrival calculation.

Optionally, a step S906 may be provided which effectively allows a device D to perform the function of a base station. In particular, the device D may transmit at least one signal to at least one base station and/or another device performing a transmitting step. In this way, the device D may transmit information about measured round trip times and measured delay times to other devices of unknown location. Alternatively or in addition, the at least one time may comprise information indicative of times of transmission or reception of signals at the device D. Accordingly, the device D can utilise its learned positional information to aid the positioning of other devices of unknown location. Accordingly, the network can grow and provide positional services for devices outside the range of the first base station BS1 and the second base station BS2.

Optionally, at step S907, a third round trip time and a third delay time may be calculated for the second base station BS2. This enhances the positional accuracy by permitting the calculation of a second time difference of arrival based on the information of the second base station BS2. To achieve this, the second base station BS2 is arranged to transmit a fourth signal. The fourth signal may be transmitted after the third signal as a separate signal. Alternatively, in a future exchange of signals between the first base station BS1 and the second base station BS2, the second signal of the future exchange as transmitted by the second base station BS2 may comprise the information of the fourth signal. In particular, the fourth signal may comprise information of a third round trip time and a third delay time as measured by the second base station BS2.

Alternatively, the fourth signal may comprises indications of the time of transmission of the second signal and the time of reception of the third signal at the second base station BS2. Optionally, the fourth signal may further comprise an indication of the time of reception of the first signal at the second base station BS2 or the second signal may comprise the time of the time of reception of the first signal and the time of transmission of the second signal. In this way, the device D can perform the necessary calculations to determine the third round trip time as the difference in time between the second base station BS2 transmitting the second signal the second base station BS2 receiving the third signal. Moreover, the device D may perform the calculation of the third delay time as the time between receiving the first signal and transmitting the second signal. In this way the device D may calculate the second time difference of arrival based on the first round trip time, first delay time, third round trip time and third delay time. Optionally, the second time difference of arrival may be calculated based further on the speed of light of the environment in which the device is operating and the distance between the first base station BS1 and second base station BS2.

Optional step S908 relates to improving the accuracy of the calculated time difference of arrivals based on averaging. In particular, the step receives at least two calculated time difference of arrivals. For example, the time difference of arrivals may be calculated according to steps S905 and S907 to provide time difference of arrivals from each of the first base station BS1 and the second base station BS2. Alternatively or in addition, the device D may stay in a single position and determined the first time difference of arrival repeatedly in the same position. Based on the at least two time difference of arrivals, step S908 averages them to determine a more accurate time difference of arrival.

As previously described, a device receives signals from a first base station BS1 and a second base station BS2. This positions the device D on a hyperbola between the base stations. The communications system may further comprise at least one third base station. The base stations are arranged to transmit and receive signals from one another. Accordingly, the device D can receive more signals from more base stations to further define its position on other hyperbolas between base stations. In this way, the intersection of the hyperbolas provide the position of the device D. For example, if a third base station BS3 communicates with the first base station BS1 and the second base station BS2 then, at least, another two time difference of arrivals may be calculated by the device D, namely between the first base station BS1 and the second base station BS2, between the first base station BS1 and the third base station BS3 and between the second base station BS2 and the third base station BS3.

At step S909, at least two time difference of arrivals are received. As explained previously, a number of different sources of these calculated time difference of arrivals are possible, such as, repeated measurement in one position of multiple time difference of arrivals, receiving time difference of arrivals from each of the first base station BS1 and the second base station BS2, by receiving signals with other base stations, such as a third base station to determine at least two further time difference of arrivals. Based on the plurality of time difference of arrivals the device D may be arranged to determine the position of the device D utilising the technique of multilateration of the received time difference of arrivals. Optionally, the technique of multilateration may be further performed taking into account the constraints of the environment in which the device D is operating. For example, if horizontal movements of the device D are not permitted, perhaps due to a mechanical constraint, then the position of the device D can be further refined without the need for further time difference of arrivals. Similarly, if the location of device D is known to lie in an area of known dimension then positions outside of the known area may be disregarded. Moreover, as previously described, multilateration may be performed utilising the time difference of arrivals and information indicative of a receive signal bias. In this way, an accurate position of device D is obtained with a solution that is scalable for a large number of devices.

Modifications and Variations

Many modifications and variations can be made to the embodiments described above, without departing from the scope of the present invention.

In one example modification, the features of the base station timings unit 404 are performed by a generating unit. The generating unit is arranged to generate a second round trip time and a second delay time from at least one received signal. The present inventors envisage that the features of the base station timings unit are not limited to the performing a timing function but to determine/generate a second round trip time and a second delay time from at least one received signal. In this way, the function of the base station timings unit/generating unit is to generate the second round trip time and the second delay time.

As described previously, in one example embodiment, the generating unit is arranged to generate the second round trip time and the second delay time decoding/extracting them from the third signal. In another example embodiment, the generating unit is arranged to calculate the second round trip time as a difference in time between the second indication and the first indication and calculating the second delay time as a difference in time between the third indication and the second indication, where the indications correspond to times at the first base stations of transmitting the first signal, receiving the second signal and transmitting the third signal.

Moreover, the generating unit may be arranged to determine a third round trip time and a third delay time which correspond with the second base station. In one example the generating unit is arranged to generate the third round trip time and third delay time by decoding/extracting the third round trip time and third delay time from the fourth signal.

In another example, the generating unit is arranged to generate the third round trip time and the third delay time by calculating the third round trip time as a difference in time between the sixth indication and the fifth indication, and calculate a third delay time as a difference in time between the fifth indication and the fourth indication. Where the indications correspond with times at the second base station of the reception of the first signal, the transmission of the second signal and the reception of the third signal.

The above described first embodiment may be modified to include multireply asymmetric time difference of arrival. In particular, this technique relies on more than one base station replying to a signal from a first base station. For example, a second base station and a third base station may reply to a single transmission from a first base station. In this way, the modified technique may be more scalable than the one previously described. In other regards, the multireply asymmetric time difference of arrival (MATDOA) is similar to the previously described asymmetric time difference of arrival (ATDOA).

Figure 15:
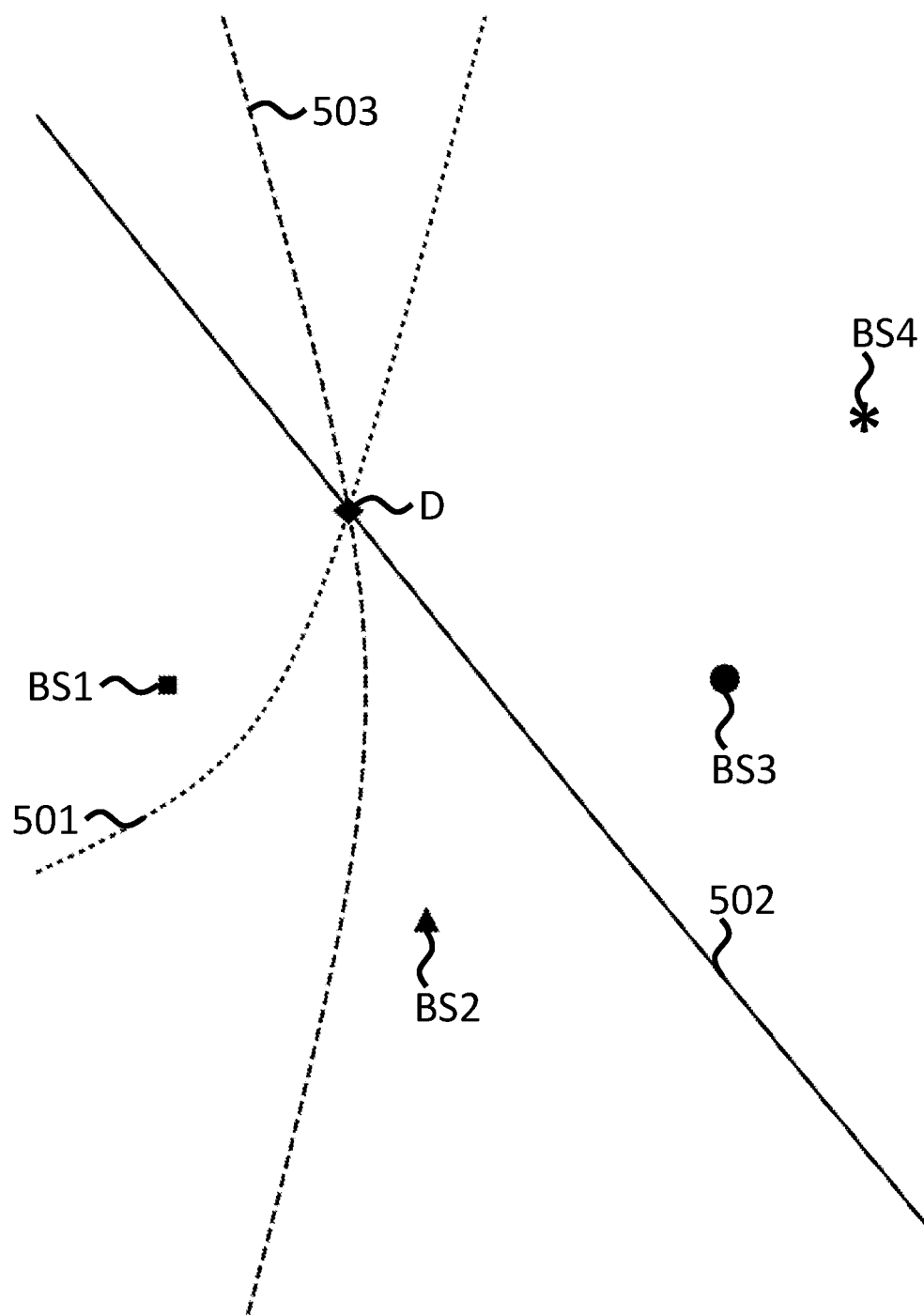
FIG. 15 is a schematic diagram of a device D according to a modification to the first embodiment. The device is arranged to determine asymmetric time difference of arrival using a modified technique of the first embodiment using first, second, third and fourth base stations.

With reference to FIG. 15, more than three base stations are located to aid the device D in determining a time difference of arrival. In this example, four base stations are shown but it will be appreciated that this modified approach to ATDOA, i.e. the MATDOA approach, may be employed with any number of base stations, preferably three or more base stations.

In this example, it may be that each of the first to third base stations, BS1, BS2 and BS3, are located within range of a signal transmitted by BS1. In this way, each of BS2 and BS3 may respond to a signal transmitted by BS1. On the other hand, a fourth base station BS4 may be located in a position unable to receive the signal from BS1, for example, due to distance from BS1, obstacles on the path between BS1 and BS4, noise or multipath reflections caused by objects between BS1 and BS4 or other similar reasons.

Figure 16:
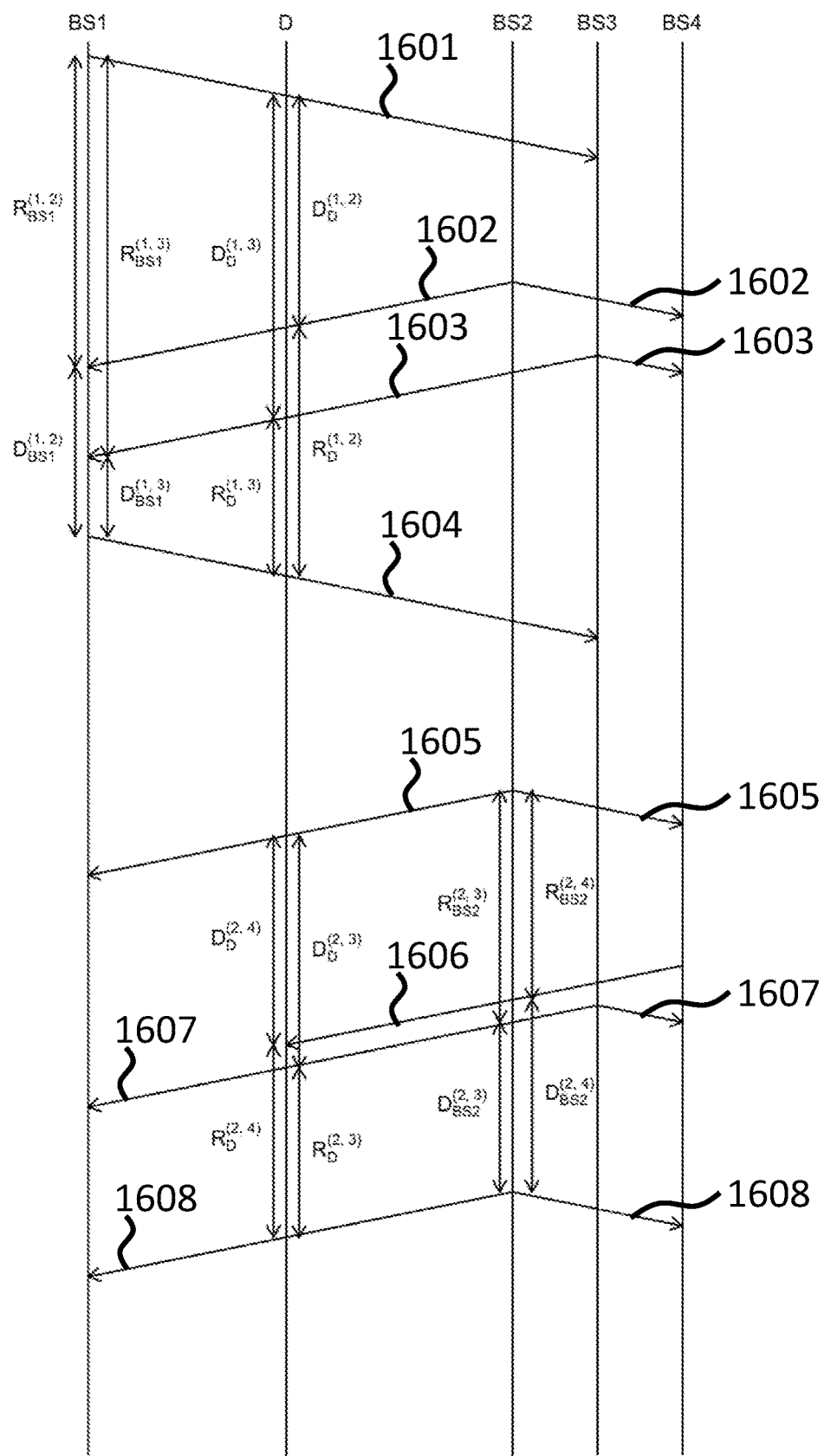
FIG. 16 is signals diagram corresponding to FIG. 15. This Figure includes additional detail of a modified technique of asymmetric time difference of arrival according to the first embodiment which employs a multireply technique.

FIG. 16 shows MATDOA signals which generally corresponds with ATDOA according to the first embodiment but modified to permit multireply requests. In this Figure, "R" is used to signify a round time and "D" is used to signify a delay time. The subscript, e.g. "BS1" in $R_{BS1}^{(1,2)}$, is used to signify the base station or device at which the interval is measured. The superscript, e.g. "(1, 2)" in $R_{BS1}^{(1,2)}$, is used to signify an index for a round of communication (here the first round is denoted by the first element, "1"), and the replying base station number (here the second element "2" represents a reply from BS2).

As shown in FIG. 16, a first base station, BS1, sends a first signal 1601. The first signal 1601 contains a request for a second base station, BS2, to respond to the first signal 1601 with a second signal 1602 (optionally also providing BS2 with some measure of delay from the receive time of the first signal 1601 at BS2 to the preferred transmit time of the second signal 1602), and additionally a request for a third base station, BS3, to respond to the first signal 1601 with a third signal 1603 (optionally also providing BS3 with some measure of delay from the receive time of the first signal 1601 at BS3 and the preferred transmit time of the third signal 1603). In this connection, the first signal 1601 is received by both of BS2, BS3 and a device D. In this example, BS4 is unable to receive the signal.

BS1 is arranged to record the time at which the first signal 1601 is sent. Based on the received signal from BS1, each of BS2 and BS3 are arranged to transmit their own signal. In this way, from a single signal 1601 transmitted by BS1, two signals are generated, one transmission from BS2 and one from BS3. In this way, multiple replies are generated from a single signal. In particular, BS2 generates a second signal 1602 whilst BS3 generates a third signal 1603.

Based on the generated signals 1602 and 1603, which are received by BS1, BS1 is able to monitor the times at which the second 1602 and third 1603 signals are received. As such, BS1 may calculate $R_{BS1}^{(1,2)}$ and $R_{BS1}^{(1,3)}$. In this regard, $R_{BS1}^{(1,2)}$ is a measure of the interval between the transmission of the first signal 1601 and the reception at BS1 of the corresponding reply from BS2, the second signal 1602. Similarly, $R_{BS1}^{(1,3)}$ is a measure of the interval between the transmission of the first signal 1601 and the reception at BS1, from BS3, of the corresponding reply, the third signal 1603.

BS1 may be arranged to further transmit a fourth signal 1604 at a time after the receipt of the second 1602 and third 1603 signals. The fourth signal 1604, similar to the first signal 1601, will be received by each of BS2, BS3 and D. The fourth signal 1604 may contain the calculated intervals $R_{BS1}^{(1,2)}$ and $R_{BS1}^{(1,3)}$. Furthermore, by predetermining a transmit time for the fourth signal 1604, BS1 may be arranged to also encode intervals $D_{BS1}^{(1,2)}$ and $D_{BS1}^{(1,3)}$ in the fourth signal 1604. In this regard, $D_{BS1}^{(1,2)}$ is a measure of the interval between the reception of the second signal 1602 at BS1 and the transmission of the fourth signal 1604. Correspondingly, $D_{BS1}^{(1,3)}$ is a measure of the interval between the reception of the third signal 1603 at BS1 and the transmission of the fourth signal 1604.

The first 1601, second 1602, third 1603 and fourth 1604 signals are received by the device D, which, by recording the receive times of the first 1601, second 1602, third 1603 and fourth 1604 signals is arranged to calculate the intervals $R_D^{(1,2)}$, $R_D^{(1,3)}$, $D_D^{(1,2)}$ and $D_D^{(1,3)}$. $R_D^{(1,2)}$ is a measure of the interval between the reception at D of the second signal 1602 and the reception at D of the fourth signal 1604. Similarly, $R_D^{(1,3)}$ relates to the reception at D of the third signal 1603 and the fourth signal 1604. $D_D^{(1,2)}$ is a measure of the interval of the reception at D of the first signal 1601 and the reception at D of the second signal 1602. Correspondingly, $D_D^{(1,3)}$ relates to the reception of the first signal 1601 and the third signal 1603.

In a manner similar to that previously described, the device D is able to calculate the time difference of arrival between BS1 and BS2, and may additionally calculate the time difference of arrival between BS1 and BS3. In particular, the time difference of arrival between BS1 and BS2 may be calculated by D using the intervals $R_D^{(1,2)}$, $D_D^{(1,2)}$, $R_{BS1}^{(1,2)}$ and $D_{BS1}^{(1,2)}$. Similarly, the time difference of arrival between BS1 and BS3 may be calculated by D using the intervals $R_D^{(1,3)}$, $D_D^{(1,3)}$, $R_{BS1}^{(1,3)}$ and $R_{BS1}^{(1,3)}$.

In this way, BS1 is able to initiate a MATDOA with both of BS2 and BS3 using a single starting signal, the first signal 1601.

Equivalent encodings of these intervals may be used to communicate to the device D in order that it may calculate these time difference of arrival measurements. It will also be appreciated that MATDOA rounds may involve any number of base stations, more than the four example base stations shown in FIG. 16.

In a further modification, BS1 may be arranged to transmit, in the fourth signal 1604, an indication of a next base station to initiate a MATDOA round.

For example, as shown in FIG. 16, BS1 may indicate in the fourth signal 1604 that BS2 should subsequently initiate a MATDOA round. As shown, BS2 subsequently initiates a MATDOA round with, in this example, BS3 and BS4 (chosen for illustration only) in a similar manner to that previously described in relation to a MATDOA round initiated by BS1 with BS2 and BS3. In particular, BS2 initiates the MATDOA round by transmitting a fifth signal 1605. The fifth signal 1605 may be received by each of BS1, BS3, BS4 and D. In this example, for clarity, only signals of the MATDOA technique are shown for D relative to BS2, BS3 and BS4. In other words, signals with regard to BS1 are not shown, although it is envisaged that such a calculation could be performed as detailed previously, for example, BS2 may be arranged to request BS1 to partake in a MATDOA round with the fifth signal 1605.

In particular, BS2 transmits a fifth signal 1605 which is subsequently received by BS3, BS4 and D. The fifth signal 1605 may invite BS3 and BS4 to respond to the fifth signal 1605.

As shown, a fourth base station BS4 is able to receive the second signal 1602, third signal 1603 and fifth signal 1605 transmitted from BS2 and BS3 due to the proximity thereto. This is advantageous because, as explained previously, BS4 is unable to receive signals from BS1. Therefore, using the signals generated by BS2 and BS3, as triggered by the first signal 1601 and the fifth signal 1605, then BS4 is able to also perform the procedure of MATDOA for a device D.

Subsequently, BS4 may transmit a sixth signal 1606 which is received by BS2, BS3 and D. In this example, BS1 is shown not to receive the sixth signal 1606 because it is out of range of BS4. However, it is envisaged that BS4 may have a different transmission power as compared to BS1 and therefore may be able to transmit signals to BS1. Additionally or alternatively, an obstacle between BS1 and BS4 might have moved thereby permitting transmissions between BS4 and BS1 and vice-versa. However, in this example, BS1 is shown to be out of range of BS4 and BS4 is shown to be out of range of BS1.

Moreover, BS3 may transmit a seventh signal 1607 which will be received by BS2, BS4 and D (together with BS1). Based on these received signals, BS2 may calculate $R_{BS2}^{(2,4)}$ and $R_{BS2}^{(2,3)}$ in a manner previously described. Similarly, based on its reception times, D may calculate $D_{BS2}^{(2,4)}$ and $D_{BS2}^{(2,3)}$.

BS2 may next transmit an eighth signal 1608 comprising the calculated $R_{BS2}^{(2,4)}$ and $R_{BS2}^{(2,3)}$. The eighth signal 1608 may also comprise newly calculated $D_{BS2}^{(2,3)}$ and $D_{BS2}^{(2,4)}$.

The device D may receive the eighth signal 1608 and the calculated intervals. Moreover, based on the reception of the eighth signal 1608, D may further calculate $R_D^{(2,3)}$ and $R_D^{(2,4)}$. Subsequently, D may calculate the time difference of arrival between BS2 and BS3, and may additionally calculate the time difference of arrival between BS2 and BS4 using the intervals $R_D^{(2,3)}$, $R_D^{(2,4)}$, $D_D^{(2,3)}$, $D_D^{(2,4)}$, $R_{BS2}^{(2,3)}$, $R_{BS2}^{(2,4)}$, $D_{BS2}^{(2,3)}$ and $D_{BS2}^{(2,4)}$.

In this way, the number of signals required to calculate multiple time difference of arrival measurements at the device D relating to multiple base station pairs is reduced. Moreover, the time required to calculate multiple time difference of arrival measurements at the device D relating to multiple base station pairs is reduced.

As described with regards to the modified procedure, it thereby becomes possible to devise a protocol of communication which operates over a larger distance than that of the maximum transmit distance for the medium employed. For example, as previously described, signals are shown to propagate from BS1 to BS3, and not to BS4 because it is out of range of BS1. However, BS4 is able to later partake in the protocol when BS2 initiates a MATDOA round with BS3 and BS4.

Moreover, the MATDOA procedure allows for the identification of failed base stations and to take actions for recovery. For example if BS2 stops working after sending the second signal 1602, BS1 will be able to identify this failure after sending the fourth signal 1604: if BS2 successfully received and acted upon the fourth signal, BS1 would be able to hear the start of the MATDOA round initiated by BS2 in the fifth signal 1605. In the absence of hearing this, for example after some timeout, BS1 could perform at least one of: (a) send a new signal asking another base station, for example BS3, to initiate a MATDOA round, (b) notify a control system for the base stations, (c) append an event to monitoring software, and (d) try sending a variant of the fourth signal 1604 at a later time at which point BS2 may be back online (for example, after BS2 has rebooted).

Collision of signals may be avoided by including a preferred delay time for each base station in the initiation of MATDOA signal. For example, the first signal 1601 may include a preferred delay time. On reception of the first signal 1601 at BS2, BS2 may wait the preferred delay time until it transmits the second signal 1602. A corresponding but different preferred delay time may also be included in the first signal 1601 for BS4. Accordingly, BS4 may delay by the received delay time after receiving the first signal until it transmits the third signal 1603. Alternatively, each of BS2 and BS3 may store a predetermined delay time between reception of the first signal 1601 and transmission of its reply, in this way, the first signal 1601 need not include a delay time. Alternatively each receiving base station may employ a random delay time. Alternatively each receiving base station may calculate a delay based upon other data in the first signal 1601. For example, since the first signal 1601 includes information about who will reply, BS2 and BS3 may use this information to generate a sympathetic delay time.

Using a delay time, BS1 is able to coordinate the replies of the base stations so that replies do not collide and so that device D can successfully receive each of the first 1601, second 1602, third 1603 and fourth 1604 signals.

Online retail businesses selling multiple product lines, such as online grocers and supermarkets, require systems that are able to store tens or even hundreds of thousands of different product lines. The use of single-product stacks in such cases can be impractical, since a very large floor area would be required to accommodate all of the stacks required. Furthermore, it can be desirable only to store small quantities of some items, such as perishables or infrequently-ordered goods, making single-product stacks an inefficient solution.

International patent application WO 98/049075A (Autostore), the contents of which are incorporated herein by reference, describes a system in which multi-product stacks of containers are arranged within a frame structure.

PCT Publication No. WO2015/185628A (Ocado) describes a further known storage and fulfilment system in which stacks of bins or containers are arranged within a framework structure. The bins or containers are accessed by load handling devices operative on tracks located on the top of the frame structure. The load handling devices lift bins or containers out from the stacks, multiple load handling devices co-operating to access bins or containers located in the lowest positions of the stack. A system of this type is illustrated schematically in FIGS. 10 to 13 of the accompanying drawings.

Figure 10:
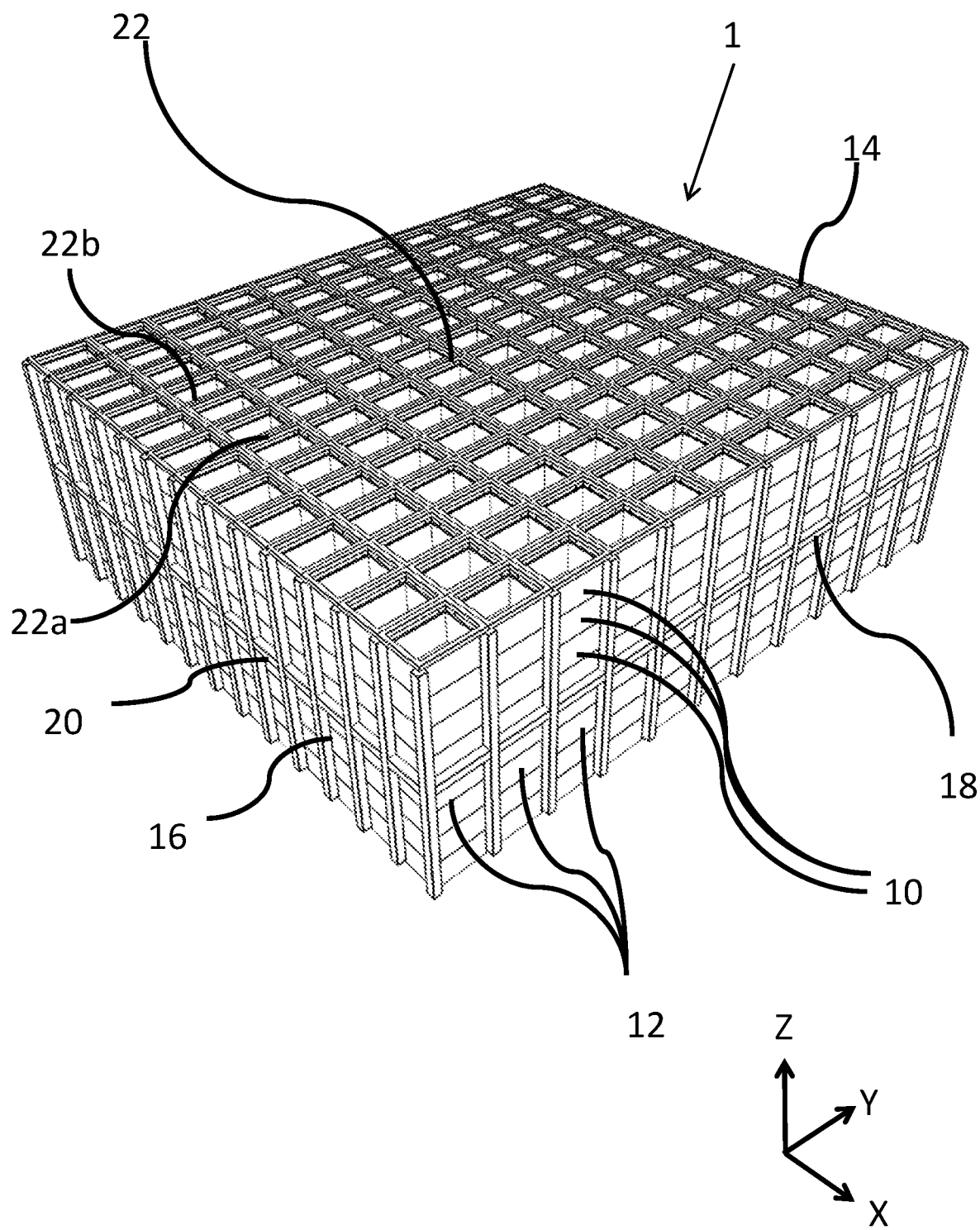
FIG. 10 is a schematic perspective view of a frame structure for housing a plurality of stacks of bins in a known storage system.
Figure 11:
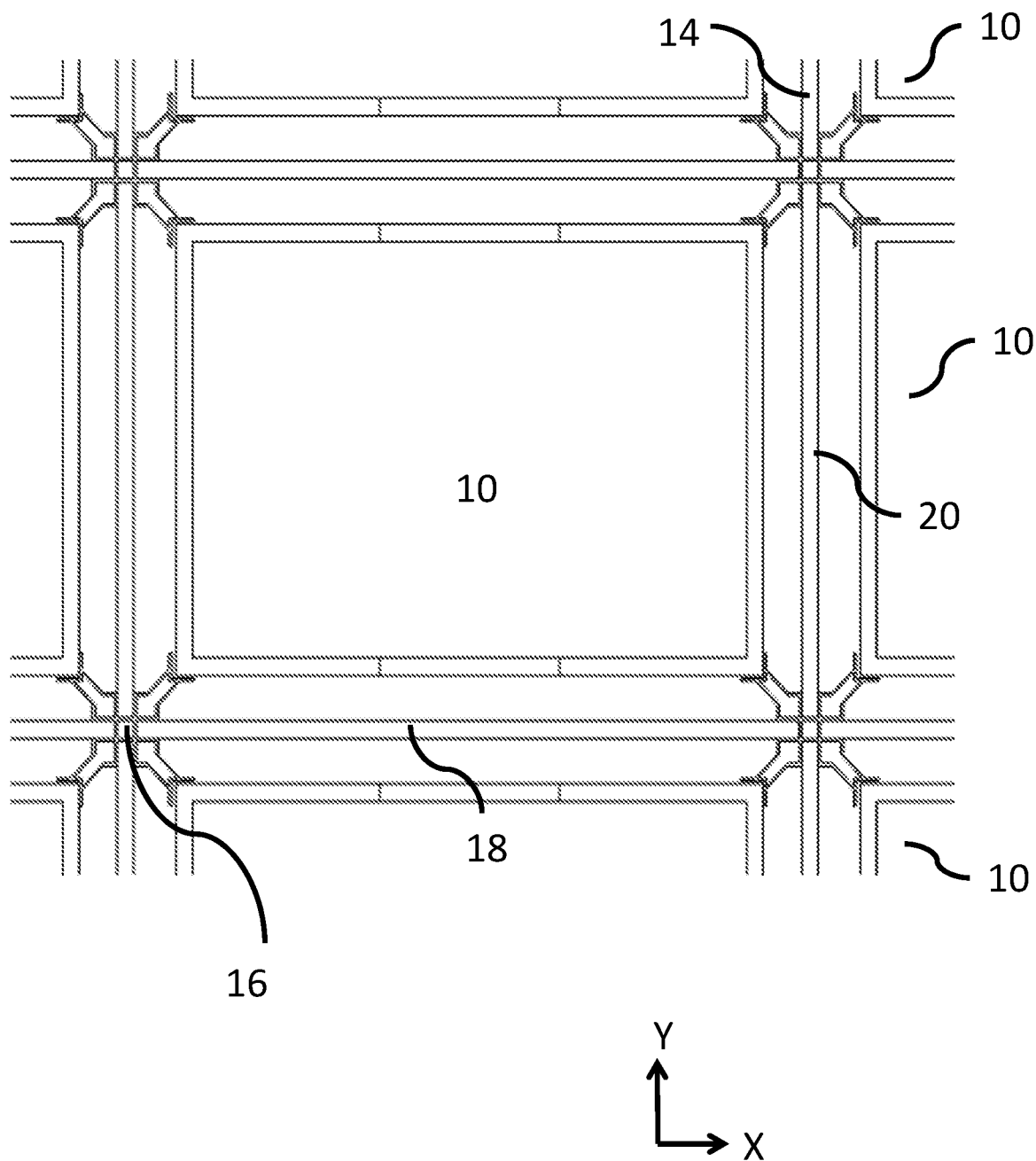
FIG. 11 is a schematic plan view of part of the framework structure of FIG. 10.

As shown in FIGS. 10 and 11, stackable containers, known as bins 10, are stacked on top of one another to form stacks 12. The stacks 12 are arranged in a grid framework structure 14 in a warehousing or manufacturing environment. FIG. 10 is a schematic perspective view of the framework structure 14, and FIG. 11 is a top-down view showing a stack 12 of bins 10 arranged within the framework structure 14. Each bin 10 typically holds a plurality of product items (not shown), and the product items within a bin 10 may be identical, or may be of different product types depending on the application.

The framework structure 14 comprises a plurality of upright members 16 that support horizontal members 18, 20. A first set of parallel horizontal members 18 is arranged perpendicularly to a second set of parallel horizontal members 20 to form a plurality of horizontal grid structures supported by the upright members 16. The members 16, 18, 20 are typically manufactured from metal. The bins 10 are stacked between the members 16, 18, 20 of the framework structure 14, so that the framework structure 14 guards against horizontal movement of the stacks 12 of bins 10, and guides vertical movement of the bins 10.

Figure 12A:
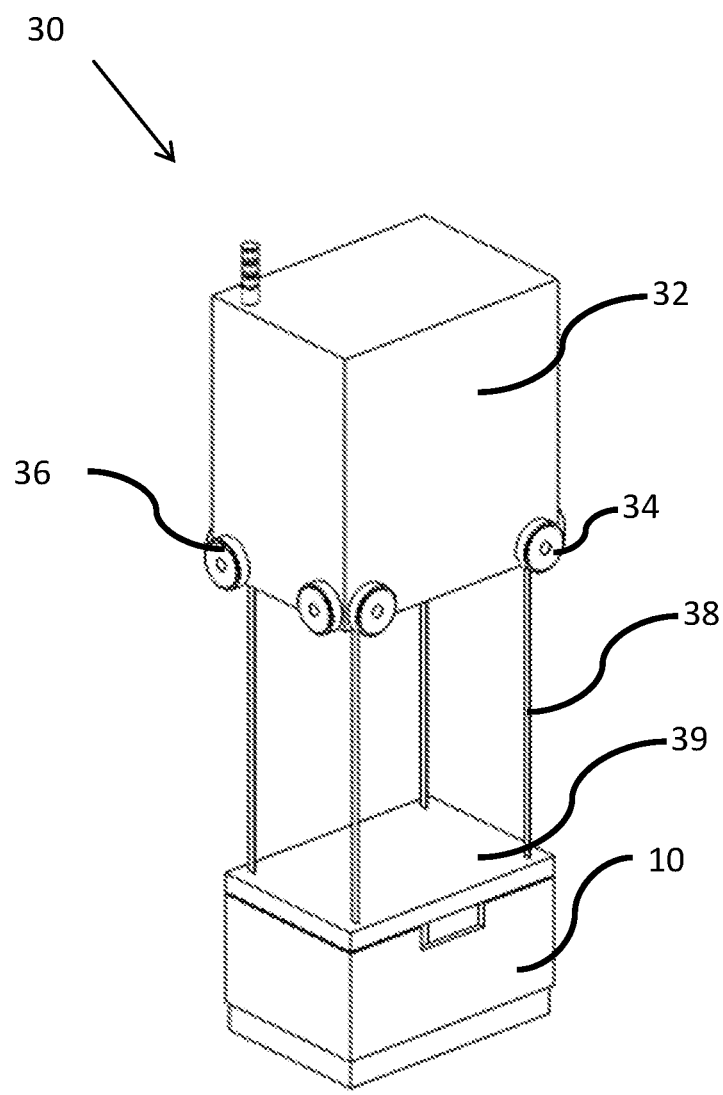
FIGS. 12(a) and 12(b) are schematic perspective views, from the rear and front respectively, of one form of load handler device for use with the frame structure of FIGS. 10 and 11.
Figures 12B, 12C:
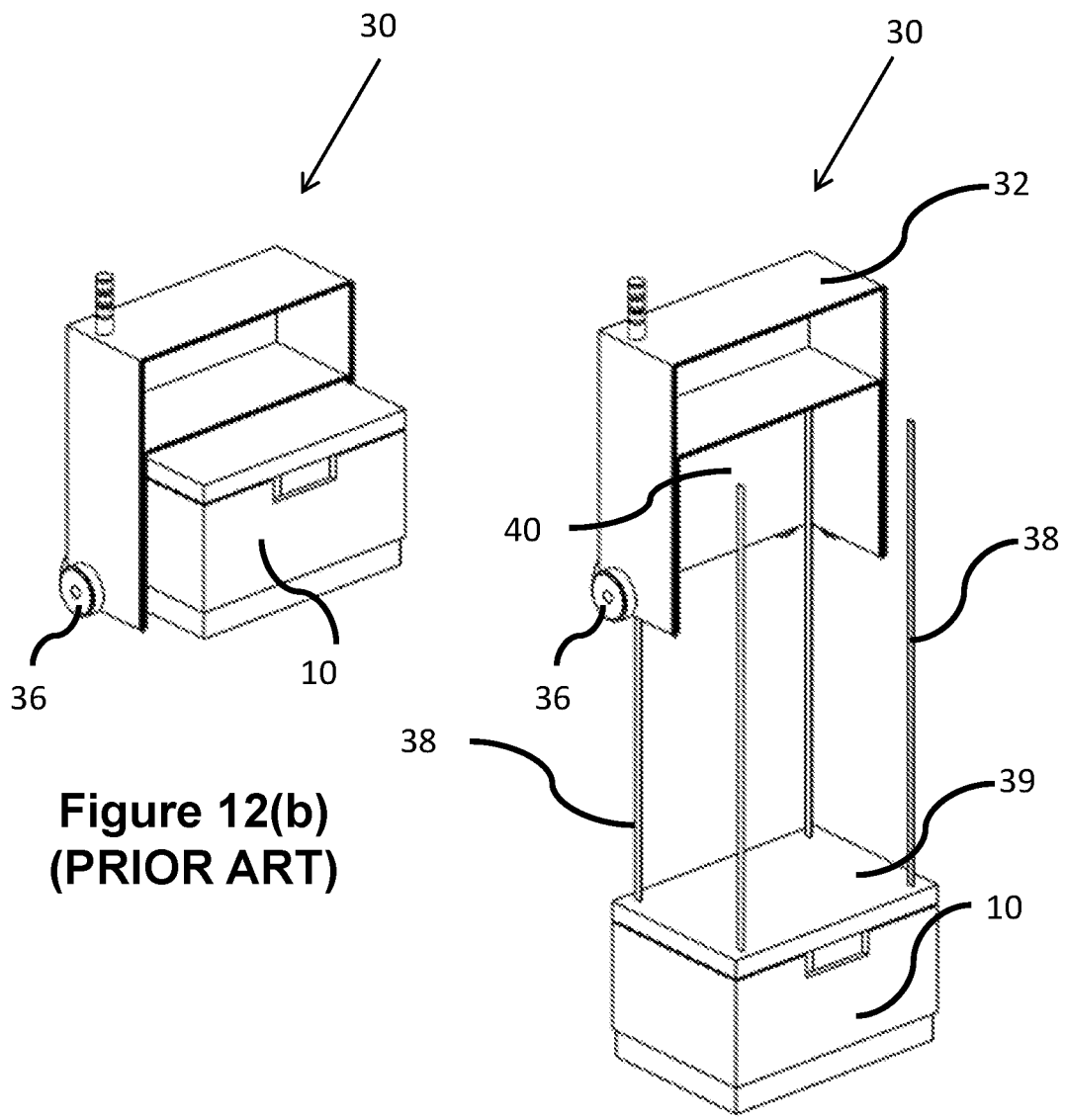
FIG. 12(c) is a schematic perspective view of the known load handler device in use lifting a bin.
Figure 13:
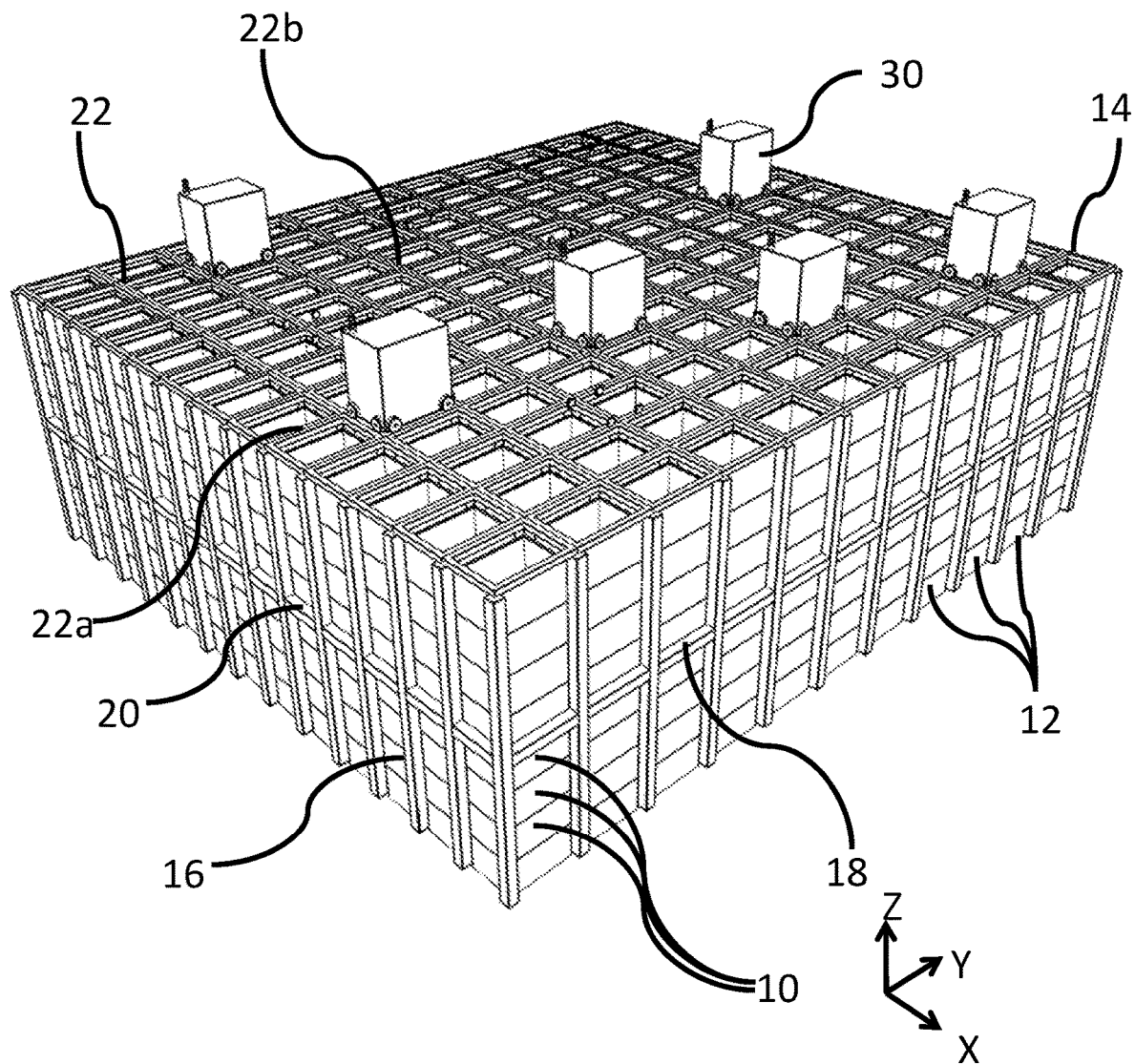
FIG. 13 is a schematic perspective view of a known storage system comprising a plurality of load handler devices of the type shown in FIGS. 12(a), 12(b) and 12(c), installed on the frame structure of FIGS. 10 and 11, the storage system comprising a plurality of drop off points or output ports.

The top level of the frame structure 14 includes rails 22 arranged in a grid pattern across the top of the stacks 12. Referring additionally to FIGS. 12 and 13, the rails 22 support a plurality of robotic load handling devices 30. A first set 22a of parallel rails 22 guide movement of the load handling devices 30 in a first direction (X) across the top of the frame structure 14, and a second set 22b of parallel rails 22, arranged perpendicular to the first set 22a, guide movement of the load handling devices 30 in a second direction (Y), perpendicular to the first direction. In this way, the rails 22 allow movement of the load handling devices 30 laterally in two dimensions in the horizontal X-Y plane, so that a load handling device 30 can be moved into position above any of the stacks 12.

One form of load handling device 30 is further described in Norwegian patent number 317366, the contents of which are incorporated herein by reference. FIGS. 12(a) and 12(b) are schematic perspective views of a load handling device 30 from the rear and front, respectively, and FIG. 12(c) is a schematic front perspective view of a load handling device 30 lifting a bin 10. However, there are other forms of load handling device that may be used in combination with the system herein described. For example a further form of robotic load handling device is described in PCT Patent Publication No. WO2015/019055, hereby incorporated by reference, (Ocado) where each robotic load handler only covers one grid space of the frame work structure, thus allowing higher density of load handlers and thus higher throughput for a given sized system.

Each load handling device 30 comprises a vehicle 32 which is arranged to travel in the X and Y directions on the rails 22 of the frame structure 14, above the stacks 12. A first set of wheels 34, consisting of a pair of wheels 34 on the front of the vehicle 32 and a pair of wheels 34 on the back of the vehicle 32, is arranged to engage with two adjacent rails of the first set 22a of rails 22. Similarly, a second set of wheels 36, consisting of a pair of wheels 36 on each side of the vehicle 32, is arranged to engage with two adjacent rails of the second set 22b of rails 22. Each set of wheels 34, 36 can be lifted and lowered, so that either the first set of wheels 34 or the second set of wheels 36 is engaged with the respective set of rails 22a, 22b at any one time.

When the first set of wheels 34 is engaged with the first set of rails 22a and the second set of wheels 36 is lifted clear from the rails 22, the wheels 34 can be driven, by way of a drive mechanism (not shown) housed in the vehicle 32, to move the load handling device 30 in the X direction. To move the load handling device 30 in the Y direction, the first set of wheels 34 is lifted clear of the rails 22, and the second set of wheels 36 is lowered into engagement with the second set of rails 22a. The drive mechanism can then be used to drive the second set of wheels 36 to achieve movement in the Y direction.

The load handling device 30 is equipped with a lifting device. The lifting device 40 comprises a gripper plate 39 is suspended from the body of the load handling device 32 by four cables 38. The cables 38 are connected to a winding mechanism (not shown) housed within the vehicle 32. The cables 38 can be spooled in or out from the load handling device 32, so that the position of the gripper plate 39 with respect to the vehicle 32 can be adjusted in the Z direction.

The gripper plate 39 is adapted to engage with the top of a bin 10. For example, the gripper plate 39 may include pins (not shown) that mate with corresponding holes (not shown) in the rim that forms the top surface of the bin 10, and sliding clips (not shown) that are engageable with the rim to grip the bin 10. The clips are driven to engage with the bin 10 by a suitable drive mechanism housed within the gripper plate 39, which is powered and controlled by signals carried through the cables 38 themselves or through a separate control cable (not shown).

To remove a bin 10 from the top of a stack 12, the load handling device 30 is moved as necessary in the X and Y directions so that the gripper plate 39 is positioned above the stack 12. The gripper plate 39 is then lowered vertically in the Z direction to engage with the bin 10 on the top of the stack 12, as shown in FIG. 12(c). The gripper plate 39 grips the bin 10, and is then pulled upwards on the cables 38, with the bin 10 attached. At the top of its vertical travel, the bin 10 is accommodated within the vehicle body 32 and is held above the level of the rails 22. In this way, the load handling device 30 can be moved to a different position in the X-Y plane, carrying the bin 10 along with it, to transport the bin 10 to another location. The cables 38 are long enough to allow the load handling device 30 to retrieve and place bins from any level of a stack 12, including the floor level. The vehicle 32 is sufficiently heavy to counterbalance the weight of the bin 10 and to remain stable during the lifting process. The weight of the vehicle 32 may be comprised in part of batteries that are used to power the drive mechanism for the wheels 34, 36. As shown in FIG. 13, a plurality of identical load handling devices 30 are provided, so that each load handling device 30 can operate simultaneously to increase the throughput of the system. The system illustrated in FIG. 13 includes two specific locations, known as ports 24, at which bins 10 can be transferred into or out of the system. An additional conveyor system (not shown) is associated with each port 24, so that bins 10 transported to a port 24 by a load handling device 30 can be transferred to another location by the conveyor system, for example to a picking station (not shown). Similarly, bins 10 can be moved by the conveyor system to a port 24 from an external location, for example to a bin-filling station (not shown), and transported to a stack 12 by the load handling devices 30 to replenish the stock in the system.

Each load handling device 30 can lift and move one bin 10 at a time. If it is necessary to retrieve a bin 10 ("target bin") that is not located on the top of a stack 12, then the overlying bins 10 ("non-target bins") must first be moved to allow access to the target bin 10. This is achieved in an operation referred to hereafter as "digging".

Referring to FIG. 13, during a digging operation, one of the load handling devices 30 sequentially lifts each non-target bin 10a from the stack 12 containing the target bin 10b and places it in a vacant position within another stack 12. The target bin 10b can then be accessed by the load handling device 30 and moved to a port 24 for further transportation.

Each of the load handling devices 30 is under the control of a central computer. Each individual bin 10 in the system is tracked, so that the appropriate bins 10 can be retrieved, transported and replaced as necessary. For example, during a digging operation, the locations of each of the non-target bins 10a is logged, so that the non-target bins 10a can be tracked.

The system described with reference to FIGS. 10 to 13 has many advantages and is suitable for a wide range of storage and retrieval operations. In particular, it allows very dense storage of product, and it provides a very economical way of storing a huge range of different items in the bins 10, while allowing reasonably economical access to all of the bins 10 when required for picking.

However, there are some drawbacks with such a system, which all result from the above-described digging operation that must be performed when a target bin 10b is not at the top of a stack 12.

Figure 14:
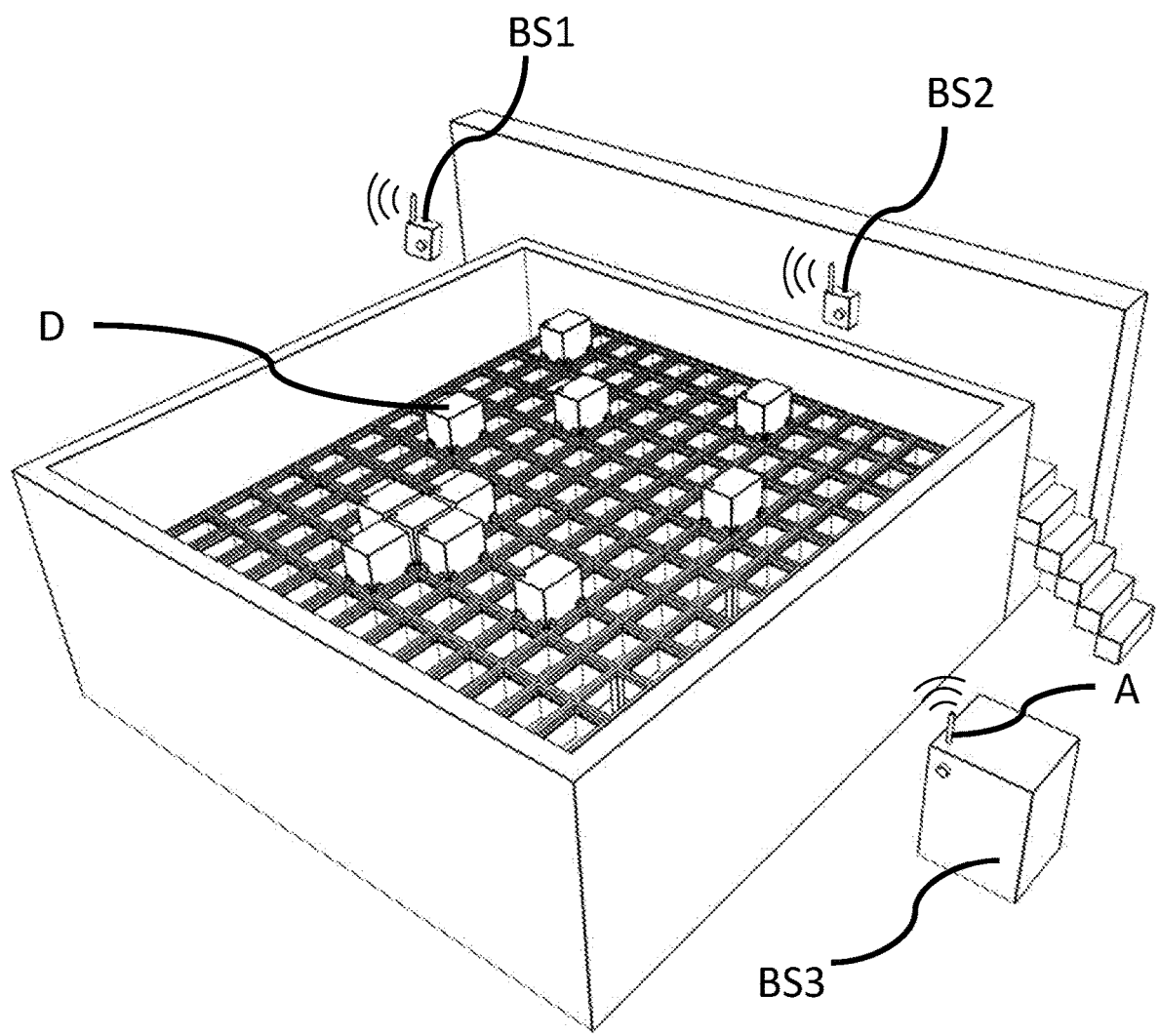
FIG. 14 is a schematic diagram of a known storage system comprising a plurality of load handler devices of the type shown in FIGS. 12(a), 12(b) and 12(c), installed on the frame structure of FIGS. 10 and 11, for which the load handler devices determine their positions using the device of the first embodiment.

As shown in FIG. 14, in one modification, the device D of the first embodiment may be utilised with regard to the storage system depicted in FIGS. 10 to 13. More specifically, there is a desire for load handling devices 30 operating on the framework structure 14 to either confirm their position when stationary, while changing direction, winching, idle, etc. in a manner potentially completely independently of existing data sources such as historical load handling device state, wheel encoders, Inertial Motion Units, etc. or to determine their position in the event of a loss of state or other failure.

The hardest problem description abstracted from these constraints is to produce a system that allows many load handling devices 30 to simultaneously work out at which position they each stand within a short time frame (e.g. in less than the time it takes to change direction). Positional accuracy of between 10 cm and 20 cm is desired.

The solution of the device D of the first embodiment should also be scalable (according to number of cells, number of load handling devices 30 and dimensions of the framework structure 14), affordable and ideally wireless.

Accordingly, as shown in FIG. 14, each of the load handling devices 30 is arranged to comprise a device D according to a first embodiment of the present invention. In this example, the load handling devices D are arranged to operate on the framework structure 14. Around/on/in the framework structure 14 are arranged three base stations, BS1, BS2 and BS3. The relative locations of the base stations may be known to the device D. Each of the base stations, BS1, BS2 and BS3 are arranged to transmit and receive messages from each of the other base stations by way of wireless signals from the antenna A, although other communication means are envisaged such as light communications. In this way, as previously described, the device D calculates a time difference of arrival between base stations so as to locate its position, and hence the location of the load handling device 30, on the framework structure 14 without the need to transmit signals to any other base station and/or device D. In one example, the device D may use the constraints that it operates in two dimensions, with no vertical motions, and within a predefined framework structure 14 of known dimensions to calculate its position even when some time difference of arrival signals are of lower reliability and/or lacking. As is also depicted in FIG. 14, each of the load handling devices only takes up a single space on the framework structure 14.

As will be appreciated, the present inventors intend for all manner of other uses for the positional location devices D of the first embodiment of the present invention. For example, the device D can be incorporated into drones, driverless cars, people tracking, agriculture, healthcare and use by emergency/rescue services, security clearances and for those which are particularly concerned with dense populations of mobile units which require high accuracy, in these situations the device D of the first embodiment is likely to be advantageous.

The foregoing description of embodiments of the invention has been presented for the purpose of illustration and description. It is not intended to be exhaustive or to limit the invention to the precise form disclosed. Modifications and variations can be made without departing from the spirit and scope of the present invention.

The invention claimed is:

1. A device arranged to operate in a communications system, the communications system including:
    a first base station; and
    a second base station, wherein:
    the first base station is arranged to transmit a first signal to the second base station,
    the second base station is arranged receive the first signal and transmit a second signal to the first base station in response to the first signal, and
    the first base station is arranged to receive the second signal and transmit a third signal to the second base station in response to the second signal;
    the device comprising:
    a receiving unit configured to receive each of first and third signals from a first base station and a second signal from a second base station;
    a delay time measuring unit configured to measure a first delay time as a time between receiving the first signal from the first base station and receiving the second signal from the second base station;
    a round trip time measuring unit configured to measure a first round trip time as a time between receiving the second signal from the second base station and receiving the third signal from the first base station;
    a base station timings unit configured to determine a second round trip time and a second delay time from at least one received signal; and
    a calculating unit configured to calculate a first time difference of arrival based on the first round trip time, first delay time, second round trip time and second delay time.

2. The device according to claim 1, wherein the first base station is arranged to measure the second round trip time as a time between transmitting the first signal and receiving the second signal, and
    the first base station is further arranged to measure the second delay time as a time between receiving the second signal and transmitting the third signal, and the third signal includes information indicative of the measured second round trip time and the measured second delay time; and wherein:
the base station timings unit is arranged to determine the second round trip time and second delay time by decoding the second round trip time and second delay time from the third signal.

3. The device according to claim 1, wherein the first signal includes a first indication of a time of transmission of a first signal from a first base station, and
the third signal includes a second indication of a time of reception of a second signal at the first base station and a third indication of a time of transmission of a third signal from the first base station, wherein:
the base station timings unit is configured to determine the second round trip time and second delay time by calculating the second round trip time as a difference in time between the second indication and the first indication and calculating the second delay time as a difference in time between the third indication and the second indication.

4. The device according to claim 1, wherein the calculating unit is configured to calculate the first time difference of arrival based on the first round trip time, first delay time, second round trip time, second delay time, the speed of light and a value indicative of a distance between a first base station and a second base station.

5. The device according to claim 1, comprising:
a transmitting unit configured to transmit at least one signal to at least one of a base station or another device comprising a transmitting unit.

6. The device according to claim 5, wherein the at least one signal transmitted to at least one of a base station or another device having a transmitting unit containing information indicative of a measured round trip time and a measured delay time.

7. The device according to claim 5, wherein the at least one of a signal transmitted to at least one base station or another device having a transmitting unit containing information indicative of a time of transmission of the signal from the device.

8. The device according to claim 1, wherein the second base station is arranged to receive the third signal and transmit a fourth signal to the first base station, wherein:
the receiving unit is configured to receive a fourth signal from a second base station,
the base station timings unit is configured to determine a third round trip time and a third delay time;
the calculating unit is configured to calculate a second time difference of arrival based on the first round trip time, first delay time, third round trip time and third delay time.

9. The device according to claim 8, wherein the second base station is arranged to measure the third round trip time as a time between transmitting the second signal and receiving the third signal, and
the second base station is further arranged to measure the third delay time as a time between receiving the first signal and transmitting the second signal, and
the fourth signal includes information indicative of the measured third round trip time and the measured third delay time; and wherein:
the base station timings unit is configured to determine the third round trip time and third delay time by decoding the third round trip time and third delay time from the fourth signal.

10. The device according to claim 8, wherein the second signal includes a fourth indication of a time of reception of the first signal at the second base station and a fifth indication of a time of transmission of the second signal from the second base station,
the fourth signal includes a sixth indication of a time of reception of the third signal at the second base station; and wherein:
the base station timings unit is configured to determine the third round trip time and the third delay time by calculating the third round trip time as a difference in time between the sixth indication and the fifth indication, and calculate a third delay time as a difference in time between the fifth indication and the fourth indication.

11. The device according to claim 8, wherein the calculating unit is configured to calculate the second time difference of arrival based on the first round trip time, first delay time, third round trip time, third delay time, the speed of light and a value indicative of a distance between a first base station and a second base station.

12. The device according to claim 1, comprising:
an averaging unit configured to receive at least two calculated time difference of arrivals from the calculating unit and configured to average the calculated time difference of arrivals.

13. The device according to claim 1, wherein the communications system includes at least a third base station,
wherein the base stations are arranged to transmit signals to and receive signals from any other base station; and wherein:
the device is configured to be arranged to receive signals transmitted between any of plural base stations and to calculate a time difference of arrival based on received signals.

14. The device according to claim 1, the device further comprising:
a determining unit configured to receive at least two time difference of arrivals and configured to determine a position of the device by multilateration of received time difference of arrivals.

15. The device according to claim 14, wherein the determining unit is configured to determine a position of the device by multilateration based on the received time difference of arrivals and information indicative of constraints of the environment in which the device is positioned.

16. The device according to claim 14, wherein the determining unit is configured to determine a position of the device by multilateration based on the received time difference of arrivals and information indicative of a receive signal bias.

17. A device according to claim 1, in combination with a communications system, the combination comprising:
a first base station;
a second base station; and
the device, wherein:
the first base station is configured to transmit a first signal to the second base station; and
the second base station is configured to receive the first signal and transmit a second signal to the first base station in response to the first signal,
the first base station is configured to receive the second signal and transmit a third signal to the second base station in response to the second signal.

18. The combination communications system according to claim 17, wherein the first base station is configured to measure the first round trip time as a time between transmitting the first signal and receiving the second signal, and the first base station is configured to measure the second delay time as a time between receiving the second signal and transmitting the third signal, wherein the third signal includes information indicative of the measured second round trip time and the measured second delay time; and wherein:

the base station timings unit is configured to determine the second round trip time and second delay time by decoding the second round trip time and second delay time from the third signal.

19. The combination communications system according to claim 17, wherein the first signal includes a first indication of a time of transmission of the first signal from the first base station, and the third signal includes a second indication of a time of reception of the second signal at the first base station and a third indication of a time of transmission of the third signal from the first base station; wherein:

the base station timings unit is configured to determine the second round trip time and second delay time by calculating the second round trip time as a difference in time between the second indication and the first indication and calculating the second delay time as a difference in time between the third indication and the second indication.

20. The combination communications system according to claim 17, wherein the second base station is configured to receive the third signal and transmit a fourth signal to the first base station wherein:

the receiving unit is configured to receive a fourth signal from the second base station, the base station timings unit is configured to determine a third round trip time and a third delay time;

the calculating unit is configured to calculate a second time difference of arrival based on the first round trip time, first delay time, third round trip time and third delay time.

21. The combination communications system according to claim 20, wherein the second base station is configured to measure the third round trip time as a time between transmitting the second signal and receiving the third signal, and the second base station is configured to measure the third delay time as a time between receiving the first signal and transmitting the second signal, and the fourth signal includes information indicative of the measured third round trip time and the measured third delay time; wherein:

the base station timings unit is configured to determine the third round trip time and third delay time by decoding the third round trip time and third delay time from the fourth signal.

22. The combination communications system according to claim 20, wherein the second signal includes a fourth indication of a time of reception of the first signal at the second base station and a fifth indication of a time of transmission of the second signal from the second base station, the fourth signal includes a sixth indication of a time of reception of the third signal at the second base station; wherein:

the base station timings unit is configured to determine the third round trip time and the third delay time by calculating the third round trip time as a difference in time between the sixth indication and the fifth indication, and calculate a third delay time as a difference in time between the fifth indication and the fourth indication.

23. The combination communications system according to claim 17, the communications system comprising:

at least a third base station, wherein base stations of the communications system are arranged to transmit signals to and receive signals from any other base station; and wherein the device is configured to be arranged to receive signals transmitted between any of plural base stations and to calculate a time difference of arrival based on received signals.

24. A storage system in combination with a communications system according to claim 17, comprising:

a first set of parallel rails extending in an X-direction, and a second set of parallel rails extending in a Y-direction transverse to the first set in a substantially horizontal plane to form a grid pattern having a plurality of grid spaces;

a plurality of stacks of containers located beneath the rails, and configured such that each stack is located within a footprint of a single grid space;

a multiplicity of load handling devices, each load handling device being arranged to selectively move laterally in the X and Y directions, above the stacks on the rails; and wherein:

the communications system base stations are positioned in locations around, in or on the plurality of stacks of containers, and the multiplicity of load handling devices each include a device.

25. The storage system according to claim 24, wherein each load handling device has a footprint that occupies only a single grid space in the storage system, such that a load handling device occupying one grid space will not obstruct a load handling device that is occupying or traversing adjacent grid spaces in the X and Y directions.

26. A method of operating a device in a communications system, the communications system having:

a first base station; and a second base station, wherein the first base station is configured to transmit a first signal to the second base station, the second base station is configured receive the first signal and transmit a second signal to the first base station in response to the first signal, the first base station is configured to receive the second signal and transmit a third signal to the second base station in response to the second signal, the method comprising:

receiving each of the first and third signals from the first base station and the second signal from the second base station;

measuring a first delay time as a time between receiving the first signal from the first base station and receiving the second signal from the second base station;

measuring a first round trip time as a time between receiving the second signal from the second base station and receiving the third signal from the first base station;

determining a second round trip time and a second delay time from at least one received signal; and calculating a first time difference of arrival based on the first round trip time, first delay time, second round trip time and second delay time.

27. The method according to claim 26, wherein the first base station is configured to measure the second round trip time as a time between transmitting the first signal and receiving the second signal, and the first base station is configured to measure the second delay time as a time between receiving the second signal and transmitting the third signal, and the third signal includes information indicative of the measured second round trip time and the measured second delay time; and wherein the determining step comprises:

determining the second round trip time and second delay time by decoding the second round trip time and second delay time from the third signal.

28. The method according to claim 26, wherein the first signal includes a first indication of a time of transmission of the first signal from the first base station, and the third signal includes a second indication of a time of reception of the second signal at the first base station and a third indication of a time of transmission of the third signal from the first base station; and wherein the determining step comprises:

determining the second round trip time and second delay time by calculating the second round trip time as a difference in time between the second indication and the first indication and calculating the second delay time as a difference in time between the third indication and the second indication.

29. The method according to claim 26, wherein the calculating step calculates the first time difference of arrival based on the first round trip time, first delay time, second round trip time, second delay time, the speed of light and a value indicative of a distance between the first base station and the second base station.

30. The method according to claim 26, wherein the method comprises:

transmitting at least one signal to at least of a one base station or another device performing a transmitting step.

31. The method according to claim 30, wherein the at least one signal transmitted to at least one of a base station or another device performing a transmitting step comprises: information indicative of a measured round trip time and a measured delay time.

32. The method according to claim 30, wherein the at least one signal transmitted to at least one of a base station or another device performing a transmitting step comprises information indicative of a time of transmission of the signal.

33. The method according to claim 26, wherein the second base station is arranged to receive the third signal and transmit a fourth signal to the first base station, the method comprising:

receiving a fourth signal from the second base station;
determining a third round trip time and a third delay time; and
calculating a second time difference of arrival based on the first round trip time, first delay time, third round trip time and third delay time.

34. The method according to claim 33, wherein the second base station is configured to measure the third round trip time as a time between transmitting the second signal and receiving the third signal, and the second base station is configured to measure the third delay time as a time between receiving the first signal and transmitting the second signal, and the fourth signal includes information indicative of the measured third round trip time and the measured third delay time; and wherein the determining step comprises:

determining the third round trip time and third delay time by decoding the third round trip time and third delay time from the fourth signal.

35. The method according to claim 33, wherein the second signal includes a fourth indication of a time of reception of the first signal at the second base station and a fifth indication of a time of transmission of the second signal from the second base station, the fourth signal includes a sixth indication of a time of reception of the third signal at the second base station and wherein the determining step comprises:

determining the third round trip time and third delay time by calculating the third round trip time as a difference in time between the sixth indication and the fifth indication, and calculating a third delay time as a difference in time between the fifth indication and the fourth indication.

36. The method according to claim 33, wherein the calculating step comprising:

calculating the second time difference of arrival based on the first round trip time, first delay time, third round trip time, third delay time, the speed of light and a value indicative of a distance between the first base station and the second base station.

37. The method according to claim 26, the comprising:
receiving at least two calculated time difference of arrivals; and
averaging the calculated time difference of arrivals.

38. The method according to claim 26, wherein the communications system includes at least a third base station;
wherein the base stations are arranged to transmit signals to and receive signals from any other base station, the method comprising:
receiving signals transmitted between any of the base stations; and
calculating a time difference of arrival based on the received signals.

39. The method according to claim 26, the comprising:
receiving at least two time difference of arrivals; and
determining a position of the device by multilateration of the received time difference of arrivals.

40. The method according to claim 39, wherein the position determining step comprises: determining a position of the device by multilateration based on the received time difference of arrivals and information indicative of constraints of the environment in which the device is positioned.

41. The method according to claim 39, wherein the position determining step comprises:
determining a position of the device by multilateration based on the received time difference of arrivals and information indicative of a receive signal bias.

42. A method of operating a communications system, the method comprising:
transmitting, by a first base station, a first signal to a second base station;
receiving, by the second base station, the first signal;
transmitting, by the second base station, a second signal to the first base station in response to the first signal;
receiving, by the first base station, the second signal;
transmitting, by the first base station, a third signal to the second base station in response to the second signal; and
operating a device within the communication system according to the method of claim 26.

43. The method according to claim 42, comprising:
measuring, by the first base station, the second round trip time as a time between transmitting the first signal and receiving the second signal;
measuring, by the first base station, the second delay time as a time between receiving the second signal and transmitting the third signal;
wherein the third signal includes information indicative of the measured second round trip time and measured second delay time and wherein the method includes:
operating a device within the communications system wherein the determining step comprises:
determining the second round trip time and second delay time by decoding the second round trip time and second delay time from the third signal.

44. The method according to claim 42, wherein the first signal includes a first indication of a time of transmission of the first signal from the first base station, and
the third signal includes a second indication of a time of reception of the second signal at the third base station and a third indication of a time of transmission of the third signal from the first base station; and
operating a device within the communications system wherein the determining step comprises:
determining the second round trip time and second delay time by calculating the second round trip time as a difference in time between the second indication and the first indication and calculating the second delay time as a difference in time between the third indication and the second indication.

45. The method according to claim 42, comprising:
receiving, by the second base station, the third signal;
transmitting, by the second base station, a fourth signal to the first base station
receiving the fourth signal from the second base station;
determining a third round trip time and a third delay time; and
calculating a second time difference of arrival based on the first round trip time, first delay time, third round trip time and third delay time.

46. The method according to claim 45, comprising:
measuring, by the second base station, the third round trip time as a time between transmitting the second signal and receiving the third signal;
measuring, by the second base station, the third delay time as a time between receiving the first signal and transmitting the second signal;
wherein the fourth signal includes information indicative of the measured third round trip time and the measured third delay time; and
wherein the determining step comprises:
determining the third round trip time and third delay time by decoding the third round trip time and third delay time from the fourth signal.

47. The method according to claim 45, wherein the second signal includes a fourth indication of a time of reception of the first signal at the second base station and a fifth indication of a time of transmission of the second signal from the second base station,
wherein the fourth signal includes a sixth indication of a time of reception of the third signal at the second base station; and
wherein the determining step comprises:
determining the third round trip time and third delay time by calculating the third round trip time as a difference in time between the sixth indication and the fifth indication, and calculating a third delay time as a difference in time between the firth indication and the fourth indication.

48. The method according to claim 42, comprising:
the base stations transmitting signals to and receiving signals from any other base station;
receiving signals transmitted between any of the base stations; and
calculating a time difference of arrival based on the received signals.

* * * * *